United States Patent [19]

Rajeshwar et al.

[11] Patent Number: 5,334,292
[45] Date of Patent: Aug. 2, 1994

[54] CONDUCTING POLYMER FILMS CONTAINING NANODISPERSED CATALYST PARTICLES: A NEW TYPE OF COMPOSITE MATERIAL FOR TECHNOLOGICAL APPLICATIONS

[75] Inventors: Krishnan Rajeshwar; Chalasani S. C. Bose, both of Arlington, Tex.

[73] Assignee: Board of Regents, The University of Texas System, Austin, Tex.

[21] Appl. No.: 931,212

[22] Filed: Aug. 17, 1992

[51] Int. Cl.$^5$ .............................................. C25B 3/00
[52] U.S. Cl. ................................. 204/59 R; 252/514; 502/101
[58] Field of Search ............... 204/59 R, 72; 252/514; 502/101

[56] References Cited

U.S. PATENT DOCUMENTS 4,454,169 6/1984 Hinden et al. ...................... 427/125
4,541,905 9/1985 Kuwana et al. ..................... 204/38.7

(List continued on next page.)

OTHER PUBLICATIONS

Bose et al., "Efficient Electrocatalyst Assemblies for Proton and Oxygen Reduction: The Electrosynthesis and Characterization of Polypyrrole Films Containing Nanodispersed Platinum Particles," *J. Electroanal. Chem.*, 333:235–256, 1992, published in Europe, month unavailable.

(List continued on next page.)

*Primary Examiner*—John Niebling
*Assistant Examiner*—Patrick J. Igoe
*Attorney, Agent, or Firm*—Arnold, White & Durkee

[57] ABSTRACT

The present invention concerns an electronically conductive polymer film comprising colloidal catalytic particles homogeneously dispersed therein. The electronically conductive polymer is preferably polypyrrole although other conductive polymers, for example, polyaniline and polythiophene are also utilizable. The preferred catalytic particles are platinum although other catalytic particles such as $RuO_2$, Ag, Pd, Ni, Cd, Co, Mo, Mn-oxide, Mn-sulfide, a molybdate, a tungstate, tungsten carbide, a thiospinel, Ru, Rh, Os, It, or a platinum palladium alloy (Pt/Pd).

The colloidal catalytic particles incorporated in the film of the present invention are less than 100 nanometers in size, preferably about 10 nm in size. In a most preferred composition, the polymer is polypyrrole and the catalytic particles are platinum.

The present invention also involves a method of producing an electronically conductive polymer film containing colloidal catalytic particles homogeneously dispersed therein. This method comprises: 1) preparing a colloidal suspension of catalytic particles in a solution comprising an electronically conductive polymer precursor. The catalytic particles may be those listed above, preferably platinum, and the electronically conductive polymer precursor is preferably pyrrole although aniline and thiophene or other monomers leading to conductive polymers may also be utilized analogously. An electronically conductive polymer film is then electrosynthesized, incorporating homogeneously dispersed colloidal catalytic particles.

In an important embodiment of the present invention, colloidal platinum particles are produced by citrate reduction of Pt (IV) to $Pt^0$. Most preferably, this citrate reduction involves a sub-stoichiometric level of citrate as compared to the Pt (IV) level.

Another important aspect of the present invention is the utilization of the porous conductive polymeric matrix of the present invention which includes homogeneously dispersed colloidal catalytic particles to catalyze a reaction. Such a catalytic reaction involves subjection of reactants to this material in an electrochemically conductive or other context. Advantages of this type of catalysis involves ready retrieval of the catalytic particles, efficient utilization of expensive catalytic particles such as platinum, resistance of the particles to at least high molecular weight poisons which will not penetrate the polymeric matrix and, finally, the lack of saturation of catalytic activity in contrast to that seen with surface coated thin polymer layers.

5 Claims, 25 Drawing Sheets

U.S. PATENT DOCUMENTS

| | | | |
|---|---|---|---|
| 4,568,442 | 2/1986 | Goldsmith | 204/284 |
| 4,581,116 | 4/1986 | Plowman et al. | 204/284 |
| 4,731,310 | 3/1988 | Anderman et al. | 429/194 |
| 4,735,875 | 4/1988 | Anderman et al. | 429/194 |
| 4,769,115 | 9/1988 | Satoh et al. | 252/514 |
| 4,839,322 | 6/1989 | Yodice | 204/59 R |
| 4,920,090 | 4/1990 | Ritter et al. | 502/439 |
| 4,954,562 | 9/1990 | Anderson | 524/779 |
| 4,957,943 | 9/1990 | McAllister et al. | 521/64 |

OTHER PUBLICATIONS

Bose et al., "Preparation, Voltammetric Characterization, and Use of a Composite Containing Chemically Synthesized Polypyrrole and a Carrier Polymer," *J. Electrochemical Soc.*, 139(9):;L75–L76, 1992, published in USA, month unavailable.

Noufi, Rommel, "The Incorporation of Ruthenium Oxide in Polypyrrole Films and the Subsequent Photooxidation of Water at n–GaP Photoelectrode," *J. Electrochem. Soc.* 130:2126–2127, 1983, published in USA, month unavailable.

Liu, Hsue–Yang and Anson, Fred C., "Redox Mediation of Dioxygen Reduction within Nafion Electrode Coatings Containing Colloidal Platinum as Catalyst," *J. Electroanal. Chem.*, 158:181–185, 1983, published in Europe, month unavailable.

Tourillon et al., "Electrochemical Inclusion of Metallic Clusters in Organic Conducting Polymers," *J. Electroanal. Chem.*, 178:357–366, 1984, published in Europe, month unavailable.

Tourillon and Garnier, "Inclusion of Metallic Aggregates in Organic Conducting Polymers. A New Catalytic System, [Poly(3–methylthiophene)–Ag–Pt], for Proton Electrochemical Reduction," *J. Phys. Chem.*, 88:5281–5285, 1984, published in USA, month unavailable.

Kao, Wen–Hong and Kuwana, Theodore, "Electrocatalysis by Electrodeposited Spherical Pt Microparticles Dispersed in a Polymeric Film Electrode," *J. Am. Chem. Soc.*, 106:473–476, 1984, published in USA, month unavailable.

Weisshaar and Kuwana, "Electrodeposition of Metal Microparticles in a Polymer Film on a Glassy Carbon Electrode," *J. Electroanal. Chem.* 163:395–399, 1984, published in Europe, month available.

Daube et al., "Electrode–Confined Catalyst Systems for Use in Optical–to–Chemical Energy Conversion," *Journal of Photochemistry*, 29:71–88, 1985, published in Europe, month unavailable.

Bartak et al., "Electrodeposition and Characterization of Platinum Microparticles in Poly(4–vinylpyridine) Film Electrodes," *Anal. Chem.*, 58:2756–2761, 1986, published in USA, month unavailable.

Vork et al., "Oxidation of Hydrogen at Platinum–Polypyrrole Electrodes," *Electrochimica Acta*, 31(12):1569–1575, 1986, published in Europe, month unavailable.

Chandler and Pletcher, "The Electrodeposition of Metals onto Polypyrrole Films From Aqueous Solution," *Journal of Applied Electrochemistry*, 16:62–68, 1986, published in Europe, month unavailable.

Vork et al., "Ohmic Resistance of Polypyrrole–Modified Electrodes with Incorporated Pt. Particles," *Electrochimica Acta*, 32(8):1187–1190, 1987, published in Europe, month unavailable.

Itaya et al., "Electrodeposition of Pt Ultramicroparticles in Nafion Films on Glassy Carbon Electrodes," *J. Electroanal. Chem.*, 208:373–382, 1986, published in Europe, month unavailable.

Holdcroft and Funt, "Preparation and Electrocatalytic Properties of Conducting Films of Polypyrrole Containing Platinum Microparticulates," *J. Electroanal. Chem.*, 240:89–103, 1988, published in Europe, month unavailable.

Kost and Bartak, "Electrodeposition of Platinum Microparticles into Polyaniline Films with Electrocatalytic Applications," *Anal. Chem.*, 60:2379–2384, 1988, published in USA, month unavailable.

Vork and Barlndrecht, "The Reduction of Dioxygen at Polypyrrole–Modified Electrodes with Incorporated Pt Particles," *Electrochimica Acta*, 35(1):135–139, 1990, published in Europe, month unavailable.

Shimazu et al., "Enhancement of the Catalytic Activity of Pt Microparticles Dispersed in Nafion–coated Electrodes for the Oxidation of Methanol by RF–Plasma Treatment," *J. Electroanal. Chem.* 284:523–529, 1990, published in Europe, month unavailable.

Gholamian and Contractor, "Oxidation of Formic Acid at Platinum Microparticles Dispersed in a Polyaniline Matrix," *J. Electroanal. Chem.* 289:69–83, 1990, published in Europe, month unavailable.

Kawai et al., "Electrochemical Synthesis of Polypyrrole Films Containing $TiO_2$ Powder Particles," *J. Electrochem. Soc.*, 137(6):1793–1796, 1990, published in USA, month unavailable.

Yoneyama and Shoji, "Incorporation of $WO_3$ into Polyprrole, and Electrochemical Properties of the Resulting Polymer Films," *J. Electrochem. Soc.*, 137(12):3826–3830, 1990, published in USA, month unavailable.

Tian et al., "Electrochemical and XPS Studies on the Generation of Silver Clusters in Polyaniline Films," *J. Electroanal. Chem.* 308:357–363, 1991, published in Europe, month unavailable.

Leone et al., "Electrodeposition and Electrochemical Behavior of Palladium Particles at Polyaniline and Polypyrrole Films," *J. Electrochem. Soc.*, 139(2):438–443, 1992, published in USA, month unavailable.

Beck et al., "Anodic Codeposition of Polypyrrole and Dispersed $TiO_2$," *Electrochimica Acta*, 37(7):1265–1272, 1992, published in Europe, month unavailable.

Wessling, "Electrical Conductivity in Heterogeneous Polymer Systems, Further Experimental Evidence for a Phase Transition at the Critical Volume Concentration," *Synthetic Metals*, 41:1057–1062, 1991, published in Europe, month unavailable.

Bose et al., "Electrosynthesis, Characterization and Modeling of Highly Efficient Polypyrrole/Pt Nanocomposite Catalysts," *Spring Meeting of the Electrochemical Society*, St. Louis, Mo., May 17–22, 1992, published in USA, month unavailable.

Dialog Search Report, 1992, printed in USA, month unavailable.

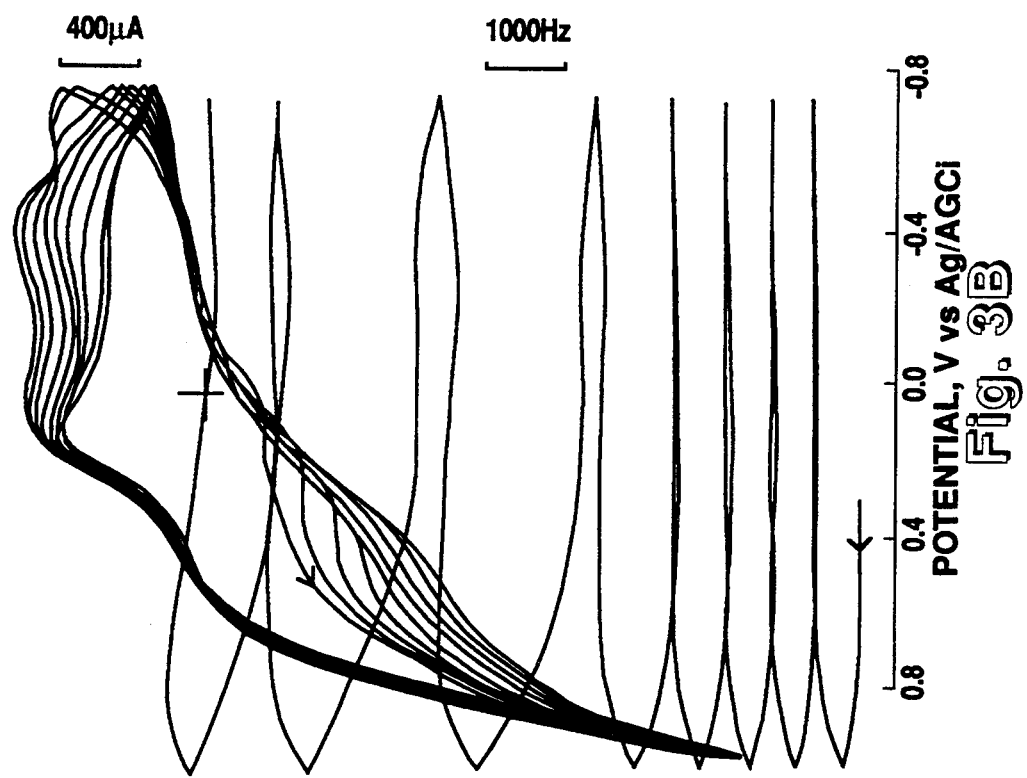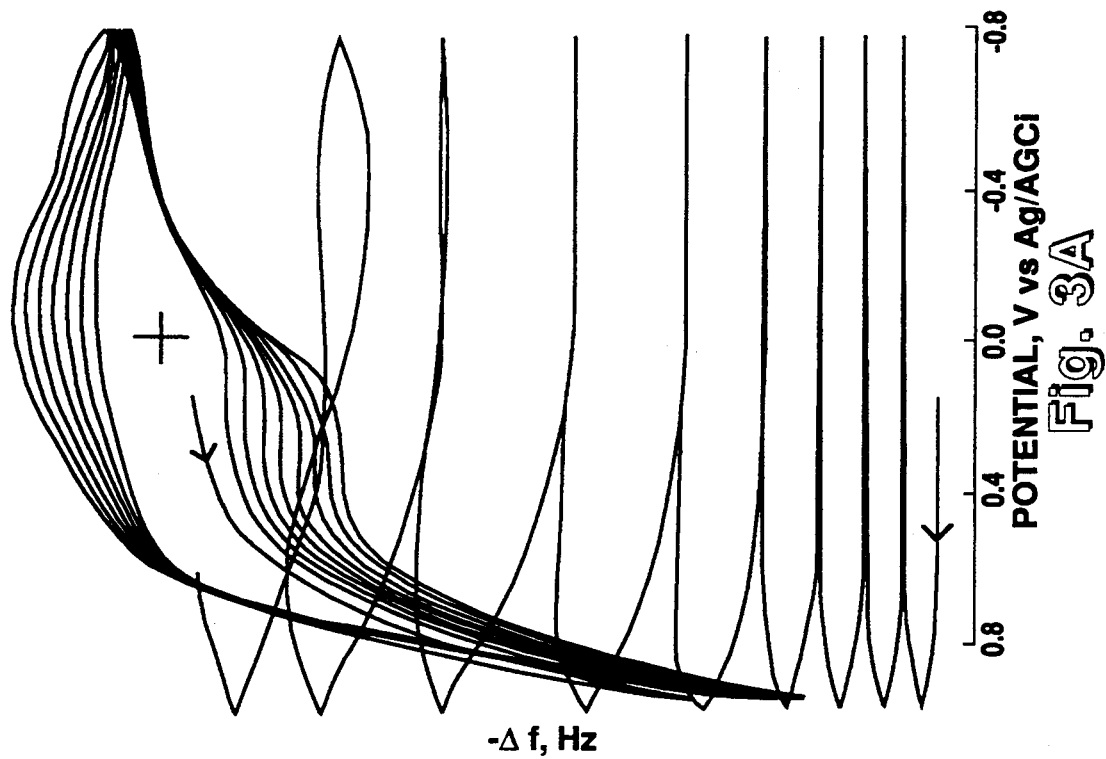

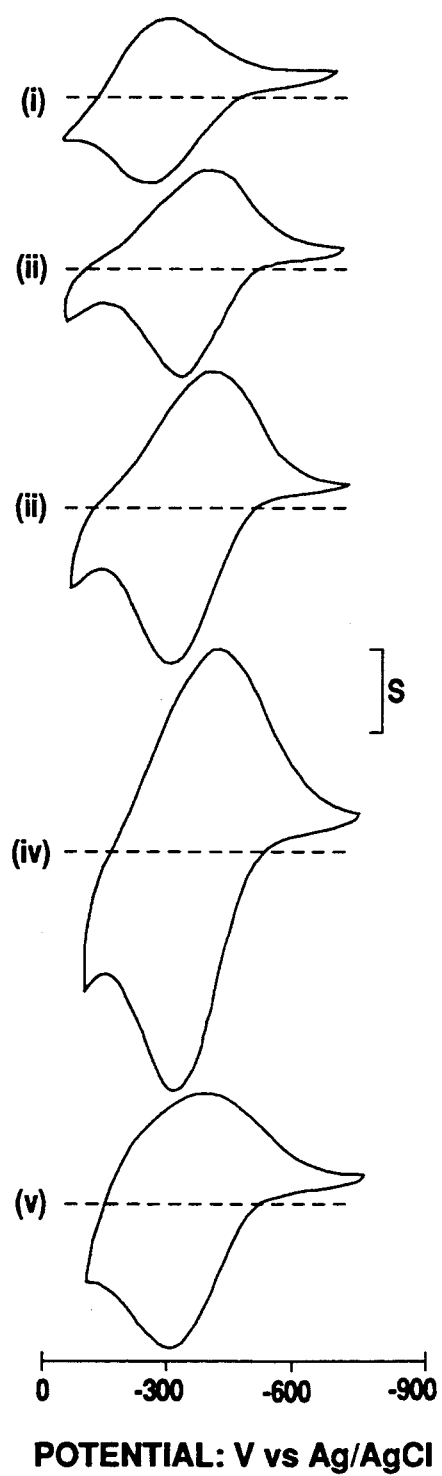
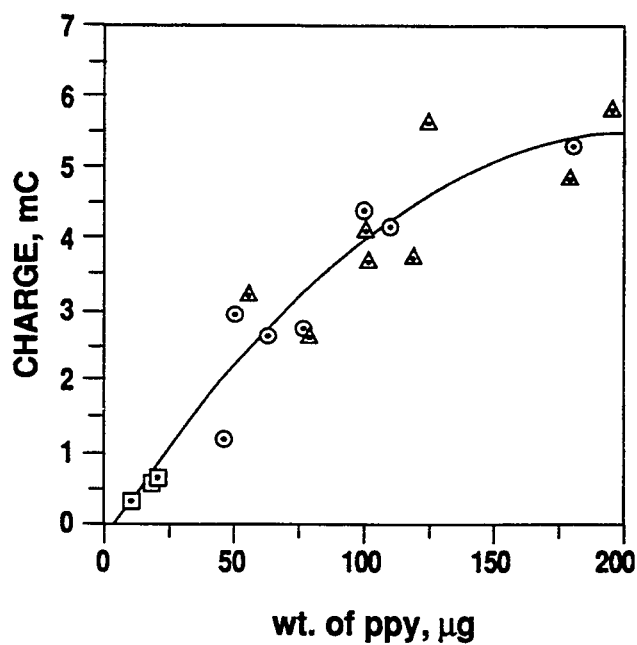
POTENTIAL: V vs Ag/AgCl
Fig. 13A
Fig. 13B

CONDUCTING POLYMER FILMS CONTAINING NANODISPERSED CATALYST PARTICLES: A NEW TYPE OF COMPOSITE MATERIAL FOR TECHNOLOGICAL APPLICATIONS

| ABBREVIATIONS | |
|---|---|
| $\Delta f$ | Frequency change |
| EQCM | Electrochemical quartz crystal microgravimetry |
| HER | Hrogen evolution reaction |
| HOR | Hydrogen oxidation reaction |
| ORR | Oxygen reduction reaction |
| ppy | Polypyrrole |
| py | Pyrrole |
| Q | Anode charge |
| RDE | Rotating disk electrode |
| RRDE | Rotating ring disk electrode |
| SCE | Saturated calomel electrode |
| SEM | Scanning electron microscopy |
| TEM | Transmission electron microscopy |
| XPS | X-ray photoelectron spectroscopy |

BACKGROUND OF THE INVENTION

The idea that an electrode surface could be "molecular-engineered" via chemical modification such that desirable features of the selected modifier can be translated to the target surface has both fundamental and practical significance. Polymer matrices have proven to be particularly useful for immobilizing interesting chemicals on electrode surfaces. One particular type of chemical modification, which is significant in terms of energy conversion and waste disposal application possibilities, involves the use of dispersed metal clusters of aggregates as catalysts on the electrode surface. Such heterogeneous catalyst systems, however, suffer from two problems: (a) First, the loss of dimensionality of the catalyst particles as a result of their surface immobilization has a deleterious effect on reaction cross-sections. Thus, the effective (maximal) catalyst loading is limited to a monolayer at best. (b) Second, the methods that have been commonly employed for the deposition of these metal catalysts on the electrode surface (e.g. electrodeposition) result in rather poor control of the size distribution (i.e. dispersion) of the catalyst particles. It is well known that catalytic applications require these particles to have colloidal dimensions in order to be most effective. Of course, homogeneous catalyst systems do not suffer from the aforementioned two problems. However, a key practical impediment exists in the use of homogeneous catalysts, viz. that of catalyst recovery and regeneration in the reactor after use. In contrast, the use of heterogeneous catalysts does not present this difficulty.

The vast majority of the prior work relies on the deposition of catalyst particles onto a preformed polymer film. This approach differs in two important respects from that of the present invention. First, the catalyst particles are incorporated in the present inventors' scheme into a growing polymer framework. This insures a 3-D array of catalyst particles. Second, the catalyst is not electroreduced from a precursor as in the majority of the work described below. Instead, the present inventors believe that the (negatively charged) $Pt^0$ colloidal particles migrate to the (positively charged) anode and are then trapped within the forming polymer matrix. The present inventors term this an "electrotrapping" mechanism. In this respect, Kawai et al., Yoneyama et al. and Beck et al. describe some synthetic semblance. However, both the nature of the incorporated particles (oxides in these references and metals or metal alloy catalysts in the present invention) and the end goals of the studies differ. Liu et al. also utilize a colloidal catalyst suspension (like the present inventors do) but their polymers are chemically very different and thus the ultimate synthetic procedure is variant in the two instances.

Noufi et al. studied the evolution of $O_2$ at polypyrrole electrodes containing colloidal $RuO_2$ particles. The latter were incorporated into the polymer during synthesis as $RuO_4^{2-}$ "dopant" anions and subsequently reduced to generate $RuO_2$ in situ. This synthesis method obviously differs in that the present inventors' Pt colloid particles (as a model example) are trapped within a growing polymer matrix not as dopant ions. No subsequent catalyst generation step is needed in the present inventor's approach. The particle size distribution of $RuO_2$ (a very important parameter in catalytic activity) further is not known in the above-cited study.

Liu et al. describe the incorporation of "finely divided and dispersed" Pt particles in polymers such as Nafion ®. It is also claimed that the scheme may be extended to other matrices such as metals, metal oxides, clays, minerals and "other types of conducting and non-conducting solids". The preparation consists of mixing solutions of the polymer (e.g. Nafion ®) and a colloidal suspension prepared according to a previus procedure, Hirai et al. Both the preparation procedure as well as the polymer differ from the present inventors' methodology although the end application of the two types of materials could well overlap.

Tourilion et al. (a) describe the electrochemical inclusion of metallic clusters in organic conducting polymers with poly 3-methylthiophene (a conductive polymer) and Cu as specific examples. The focus of the study is the characterization of these clusters using in situ dispersive X-ray absorption. The major difference lies with the catalyst incorporation procedure in that the metal ions are electroreduced onto a pre-existing polymer framework. This is what the present inventors refer to as the "2-D architecture" in the present application.

Tourilion et al. (b) describe a very similar study except that catalysts such as $RuO_2$, Ag, and Pt also are considered. The focus of the present study is on the hydrogen evolution reaction (here and elsewhere to be abbreviated as HER).

In Kao et al., the electrochemical dispersion of Pt microparticles in polymeric matrices such as poly(-vinylacetic acid) is described. The points of departure from the present inventors' approach include the type of polymer (non-electronically conductive), method of catalyst incorporation (not electrotrapped but electroreduced, see above), and the polymer thickness (very thin, 400–1000 Å compared to that of the present invention).

Weisshaar et al. describe a similar study but it also includes Pd, Ag, Ni, Cd and Pt-Pd catalysts.

Daube et al. is a comprehensive review of the work of Wrighton et al. on the incorporation of catalyst (mainly Pd) particles in viologen-based redox polymers. The polymers considered are chemically very different from ours. The method of catalyst attachment (which occurs by electrostatic binding onto the polymer backbone) in the Wrighton work also is fundamentally different from the present inventors' approach.

In Bartak et al. (1986), platinum "microparticles" were electrodeposited at three types of poly(4-vinyl pyridine) films on glassy carbon electrodes. Again the catalyst was incorporated into a pre-existing polymer network by soaking the latter with $PtCl_6^{2-}$ followed by electroreduction of the latter.

In Vork et al. (1986), two methods are described for the dispersion of Pt particles in polypyrrole: (a) electrodeposition of Pt onto a preformed polymer (see above) and (b) the incorporation of Pt particles during the polymerization of pyrrole. Method (a) has been discussed earlier. In Method (b) 44 µm Pt particles were used as "fine powdered metal dust" and not as colloidal catalyst as in the present inventors' methodology. These particles obviously are too large to be catalytically useful (see Mukerjee).

In Chandler et al., metals (e.g., Pd, Pt and Pb) are electrodeposited onto a preformed polypyrrole film.

Vork et al. (1987) is a study similar to York et al. (1986), but the focus of the study here was to monitor the ohmic resistance of the Pt-loaded polymer.

Itaya et al. have electroreduced Pt catalyst particles onto a Nafion® polymer network and have measure the HER. Both the type of polymer and the method of catalyst incorporation differ from the present inventors' approach.

Three types of Pt-loaded polypyrrole are considered in Holdcroft et al. Their "Type II" electrodes are similar to those discussed above. Type III and IV electrodes were prepared by immersing pre-reduced and oxidized polymer films in $PtCl_6^{2-}$ solution. Again, these methods are distinctly different from the one the present inventors employ. These authors do claim, however, to have achieved a 3-D catalyst distribution in Types III and IV electrodes (as verified by Auger electron spectroscopy depth profiles). No catalyst particle size information is presented. The conclusions of these authors (namely that of poor substrate permeation, c.f. p. 102) are also at variance with the present inventors' conclusions. The present inventors observe no substrate mass transport limitations in their studies and systems.

Bartak et al. (1988) have utilized methodology as in Kao et al., Weisshaar et al., and Bartak et al. (1986), but for a conductive polymer (polyaniline) instead. Reactions studied included HER and methanol oxidation. The catalyst incorporation strategy (as in the earlier studies by this group) differs in a fundamental sense from the present inventors'.

In Vork et al., again, a performed polypyrrole layer is used (unlike in the present inventors' approach), and Pt catalyst deposited by constant current electrolysis of a $H_2PtCl_6$ solution. The authors use the resultant polypyrrole/Pt system for the study of oxygen reduction. Such electroreductive platinum deposition yields Pt particles greater than 100 nm in size.

Shimazu et al. use methodology and systems very similar to that described earlier in Itaya et al.

In Gholamian et al., platinum is loaded onto a preformed polyaniline by potentiodynamic cycling in $H_2PtCl_6$. The method of preparation and specific systems considered obviously are different from those of the present invention.

Kawai et al. report the electrochemical synthesis of polypyrrole with incorporated $TiO_2$ particles. Pyrrole was electrolyzed in the presence of illuminated $TiO_2$ and also in the presence of aqueous $TiO_2$ suspensions. The end goal (unlike the approach of the present inventors) of this study is to impart photosensitivity to the polypyrrole.

Yoneyama et al. (1990) utilize $WO_3$ particles instead for incorporation into polypyrrole. Similar comments apply as in Kawai et al.

Tian et al. describe electrochemical and XPS studies of silver clusters in polyaniline films. The method of catalyst incorporation rather similar to Noufi in that Ag ions are introduced as metal complex (thiocyanide) ions and then subsequently electroreduced to generate Ag metallic clusters.

Wessling et al. propose to use convention filler materials (which are used in admixture with conventional polymers, e.g., rubber) along with polypyrrole. There is little parallel to the invention here either in the preparation details or with the end applications.

In Leone et al., palladium particles were incorporated by electroreducing $PdCl_2$ onto preformed polypyrrole and polyaniline films.

In Hable et al., Pt/Sn bimetallic catalysts were electrodeposited onto a preformed polyaniline layer from aqueous solutions containing Pt(IV) and Sn(IV).

Beck et al. describe an extension of the approach in Kawai et al. and describes the dispersion of $TiO_2$ particles in polypyrrole. Photoelectrochemical properties of the resultant composite are explored. Similar comments as to Kawai et al. apply to the relation of this study to the proposed invention.

Hinden et al. relate to a catalytically modified corrosion-resistant valve-metal (e.g., Ti, Zr, Ta, Nb) which is then embedded in a support electrode (e.g., Pb-Ag alloy) matrix. The catalysts include the platinum group metals or the corresponding oxides. An "electrically conductive polymer" (e.g., polyacrylonitrile) is used as a precursor. The electrode structure, the method of preparation outlined in this invention, and the component materials thereof all are fundamentally and chemically different from the present inventors' approach.

In Kuwana et al., the concept and the approaches described are related to the material discussed above in relation to Kao et al., Weisshaar et al., Bartak et al., (1986) and Bartak et al. (1988) from the same research group.

Polymer films on electrode surfaces containing dispersed metallic clusters or aggregates (Bookbinder et al.; Dominey et al.; Bruce et al.; Simon et al. (1983 and 1985); Harrison et al.; Stalder et al.; Pickup et al.; Liu et al.; Tourilion et al. (b); Tourilion et al. (a); Yasser et al.; Weisshaar et al.; Bartak (1988); Lyons et al. (a); Lyons et al. (b); are of both practical and fundamental importance. Aside from their useful catalytic activity towards technologically important substrates, these microheterogeneous assemblages also provide unique opportunities for exploring novel types of catalyst-support interactions. For example, polyaniline and Nafion containing dispersed Pt microparticles have been reported to show significant enhancement in catalytic activity, relative to bulk Pt, towards the oxidation of methanol (Bartak et al. (1988), Gholamian et al., Shimazu et al.). Electronically conductive polymers such as polyaniline and polypyrrole are particularly attractive host media for the confinement of catalyst particles (Tourilion et al. (b), Burtak et al. (1988), Gholamian et al., Chandler et al., Vork et al. (1986), Vork et al. (1990), Holdcroft et al., Bedioni et al.). These media potentially provide an efficient route for the shuttling of electronic charge to the catalyst centers, especially in reactions spanning a potential regimen wherein the polymers retain their electronic conductivity. However, prior studies on conductive polymer/catalyst composites have largely utilized catalyst particles in the micrometer size range (Gholamian et al., York et al., Holdcroft et al.). It is well known that particle size plays a crucial role in catalytic activity (Mukerjee). The present inventors describe a novel route to the electrosynthesis of polypyrrole/thin films containing dispersed Pt particles in the catalytically useful nanometer size range. Unlike the electroreduction method employed in most previous studies (i.e., $PtCl_4^{-2}$ or $PtCl_6^{-4} \rightarrow Pt^0$), the present inventors have used a colloidal dispersion of $Pt^0$ (Mills et al.; Furlong et al.) in conjunction with the pyrrole-based polymerization medium to generate polypyrrole/Pt thin films. The Pt colloidal particles apparently are "electrotrapped" within the growing polymer matrix affording a three-dimensional array of catalyst within it (c.f. FIG. 1).

This electrosynthesis process was monitored at an underlying Au electrode using quartz-crystal microgravimetry. The use of this latter technique in the electrochemical arena has rapidly grown in recent years; reviews are available (Thompson et al; Schumacher). Using this technique, the present inventors were able both to monitor the dynamics of thin film growth as well as to quantify the uptake of Pt catalyst by the polymer. The present inventors are not aware of similar studies on chemically modified electrode surfaces using this powerful analytical tool.

Finally, the present inventors demonstrate via hydrodynamic voltametry the unusual catalytic activity of their polypyrrole/Pt (ppy/Pt) films towards the reduction of dioxygen and protons. In particular, the present inventors highlight the enhancement in catalytic activity obtained by distributing the Pt colloids in a three-dimensional array with in the polypyrrole matrix (FIG. 1). Thus, unlike with the usual two-dimensional (surface) catalysis situations (FIG. 1), thicker electrodes show higher catalytic activity towards the above model substrates as opposed to thinner samples. The three-dimensional distribution of $Pt^0$ particles within the polypyrrole matrix also facilitates the efficient shuttling of charge from the (underlying) support electrode to the reaction site. This feature becomes especially important when a reaction of interest occurs in circumstances where the polymer is a poor electronic conductor.

SUMMARY OF THE INVENTION

The present invention concerns an electronically conductive polymer film comprising colloidal catalytic particles homogeneously dispersed therein. The electronically conductive polymer is preferably polypyrrole although other conductive polymers, for example, polyaniline and polythiophene are also utilizable. The preferred catalytic particles are platinum although other catalytic particles such as $RuO_2$, Ag, Pd, Ni, Cd, Co, Mo, Mn-oxide, Mn-sulfide, a molybdate, a tungstate, tungsten carbide, a thiospinel, Ru, Rh, Os, Ir, or a platinum palladium alloy (Pt/Pd).

The colloidal catalytic particles incorporated in the film of the present invention are less than 100 nanometers in size, preferably about 10 nm in size. In a most preferred composition, the polymer is polypyrrole and the catalytic particles are platinum.

The present invention also involves a method of producing an electronically conductive polymer film containing colloidal catalytic particles homogeneously dispersed therein. This method comprises: 1) preparing a colloidal suspension of catalytic particles in a solution comprising an electronically conductive polymer precursor. The catalytic particles may be those listed above, preferably platinum, and the electronically conductive polymer precursor is preferably pyrrole although aniline and thiophene or other monomers leading to conductive polymers may also be utilized. An electronically conductive polymer film is then electrosynthesized, incorporating homogeneously dispersed colloidal catalytic particles.

In an important embodiment of the present invention, colloidal platinum particles are produced by citrate reduction of Pt (IV) to $Pt^0$. Most preferably, this citrate reduction involves a sub-stoichiometric level of citrate as compared to the Pt (IV) level.

Another important aspect of the present invention is the utilization of the porous conductive polymeric matrix of the present invention which includes homogeneously dispersed colloidal catalytic particles to catalyze a reaction. Such a catalytic reaction involves subjection of reactants to this material in an electrochemically conductive or other context. Advantages of this type of catalysis involves ready retrieval of the catalytic particles, efficient utilization of expensive catalytic particles such as platinum, resistance of the particles to at least high molecular weight poisons which will not penetrate the polymeric matrix, and finally the lack of saturation of catalytic activity with thick polymer layers.

BRIEF DESCRIPTION OF THE DRAWINGS

FIGS. 3A and 3B. Superposition of cyclic voltammograms and EQCM data for a precondition Au electrode surface showing the electrosynthesis of ppy (FIG. 3a) and ppy/Pt (FIG. 3b) thin films. The electrosynthesis medium consisted of 0.1M KCl and 0.05M pyrrole with no platinum (FIG. 3a) and 3 mM platinum (FIG. 3b) respectively. The potential scan-rate was 50 mV/s for both voltametry and EQCM.

FIGS. 5a–c show these data represented in terms of $-\Delta f$ vs. time, Q vs. time, and $-\Delta F$ vs. Q plots respectively. The ordinate and abscissa intercepts in FIG. 5b and 5c again arise from the transition layer regime. The sample notation 0, 1, 3 and 5 corresponds to the platinum content (in mM) of the solution used for film synthesis. Note that here and elsewhere "0" refers to a solution containing only 0.1M KCl and 0.05M pyrrole. Additionally "0"

refers to a control 0.1M KCl solution containing 0.05M pyrrole and sodium citrate and no platinum. The straight lines were least-squares fitted through the data points.

Figure 6A:
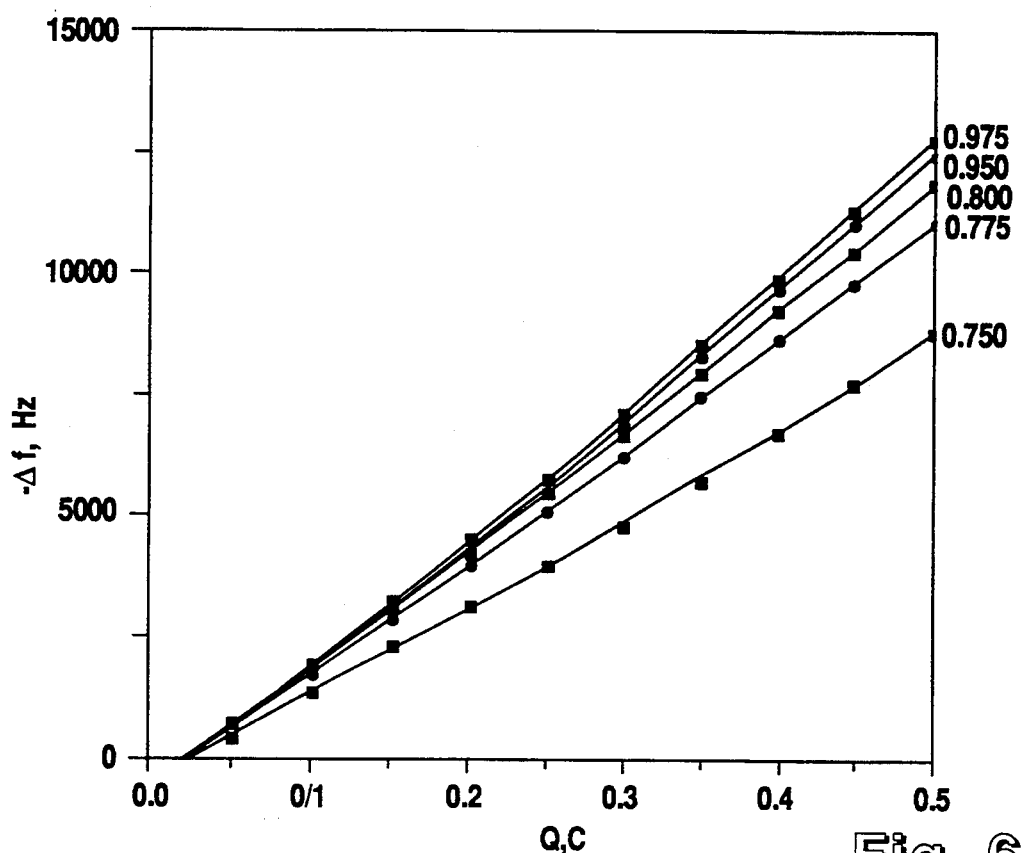
Figure 6B:
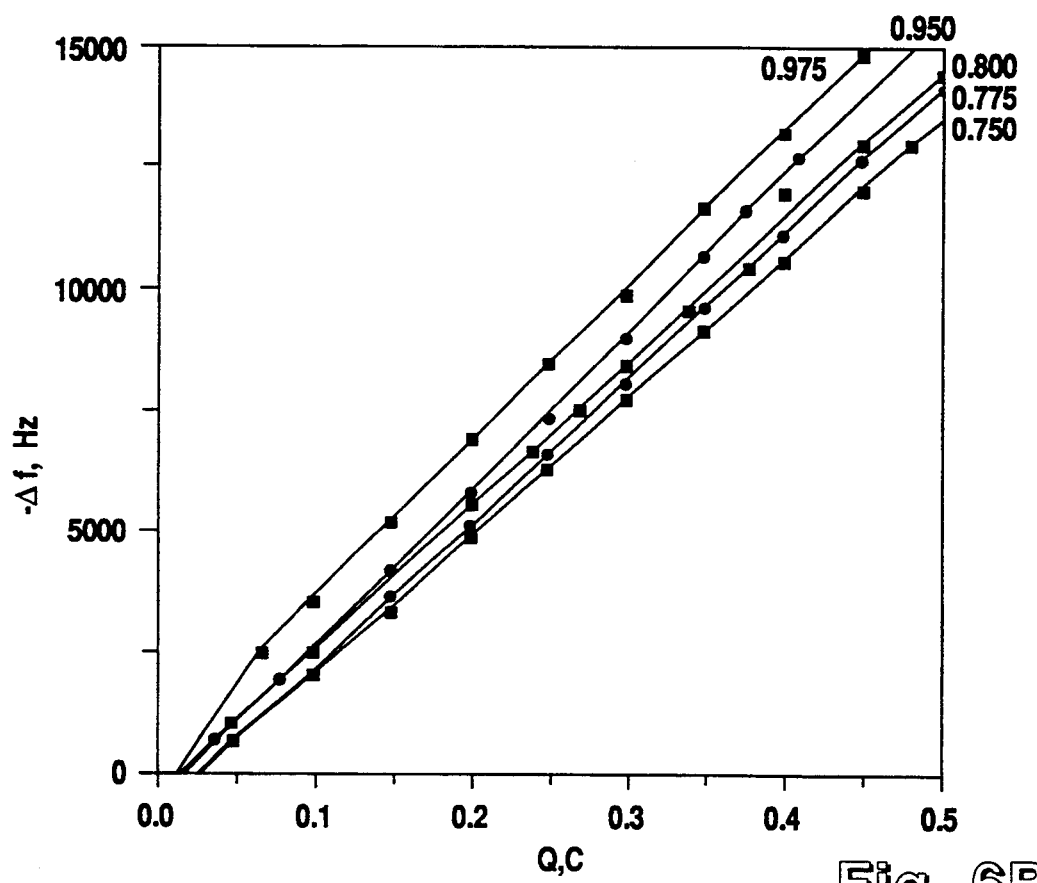

FIGS. 6A and 6B. Plots of $-\Delta f$ vs. Q for a ppy sample (FIG. 6a) and a ppy/Pt thin film (FIG. 6b). The latter was generated from a solution containing 3 mM platinum. The electrodes were stepped from rest to the final potentials shown. The straight line segments were least-squares fitted throughout experimental data points except for the initial portion of the +0.80 V data in FIG. 6b.

Figure 7A:
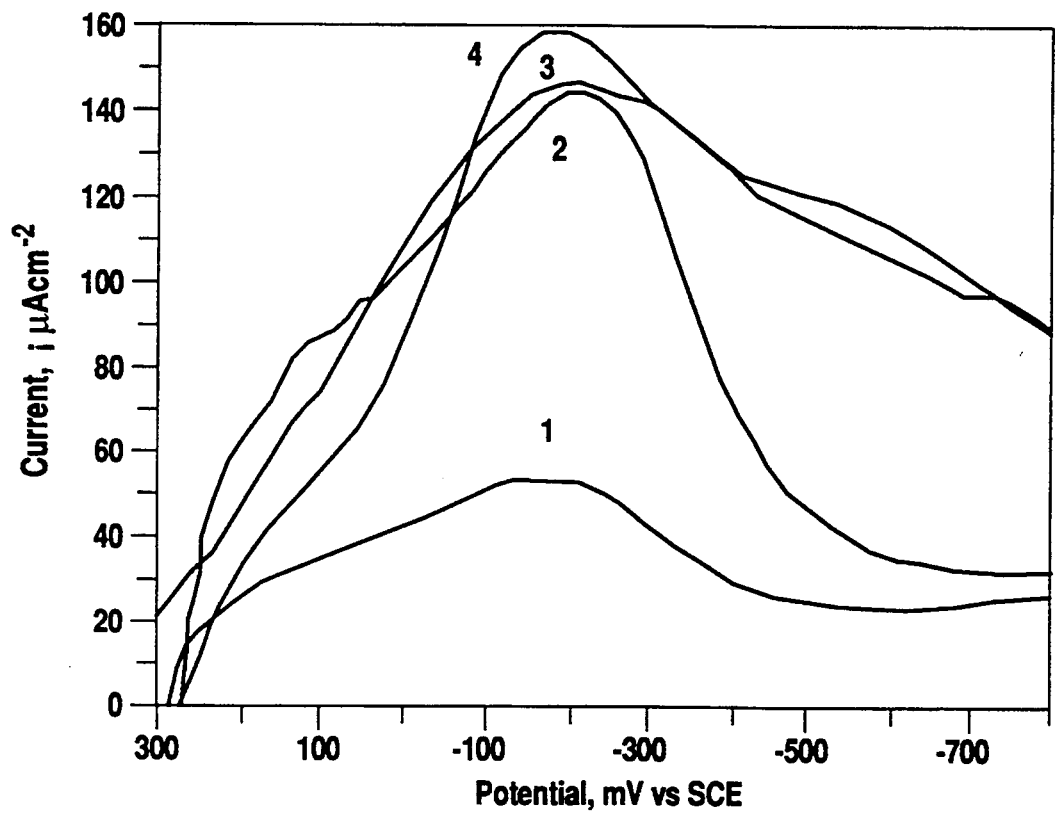
Figure 7B:
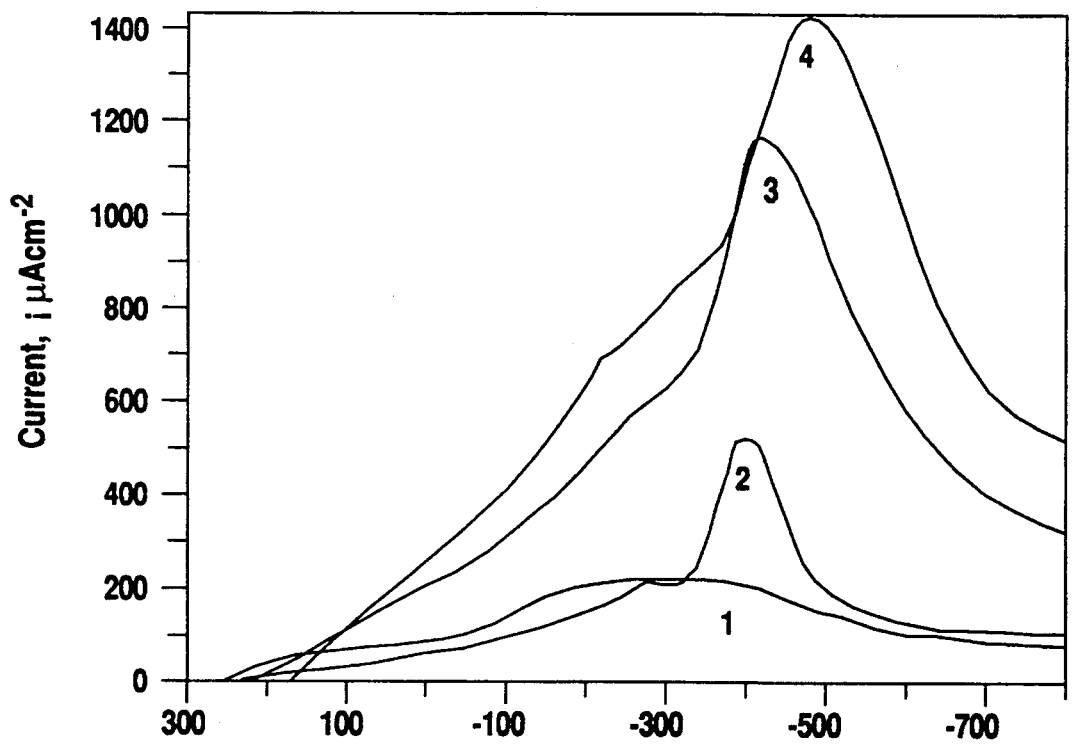

FIGS. 7A and 7B. Polarization curves (electrode rotation speed: 500 rpm) for the hydrogen evolution reaction (HER) at "conventional" ppy-Pt samples (FIG. 7a) and the "new" ppy/Pt electrodes (FIG. 7b). Refer to text for description and distinction between the two types of Pt incorporation. The potential scan-rate was 1 mV/s and $N_2$-saturated 0.05M $H_3PO_4$ was used. The sample notation is as follows. FIG. 7a: 1. ppy(0.1)—Pt(0.007); 2. ppy(0.3)—Pt(0.020); 3. ppy(0.8)—Pt(0.055); 4. ppy(1.1)—Pt(0.071). [The numbers in parentheses above denote the coulombs consumed either for the (second) layer ppy growth or for $Pt^0$ electrodeposition.] FIG. 7b: 1.0.1 C; 2.0.3 C; 3.0.8 C; 4.1.1 C.

Figure 8A:
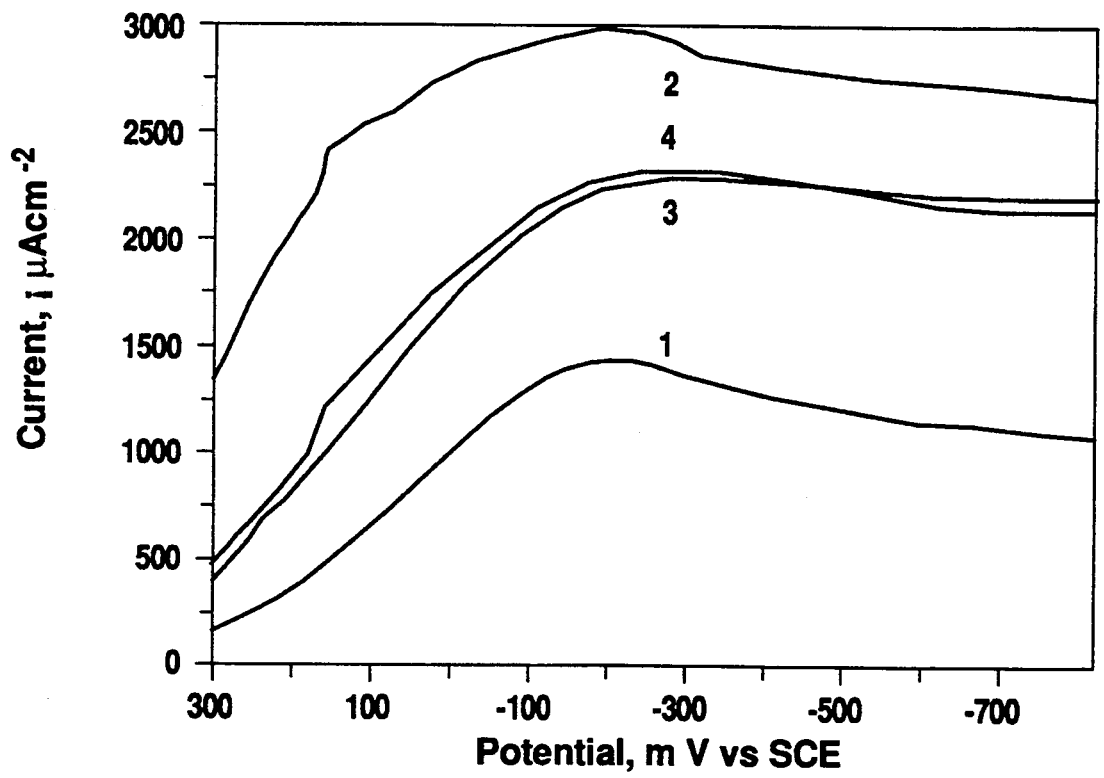
Figure 8B:
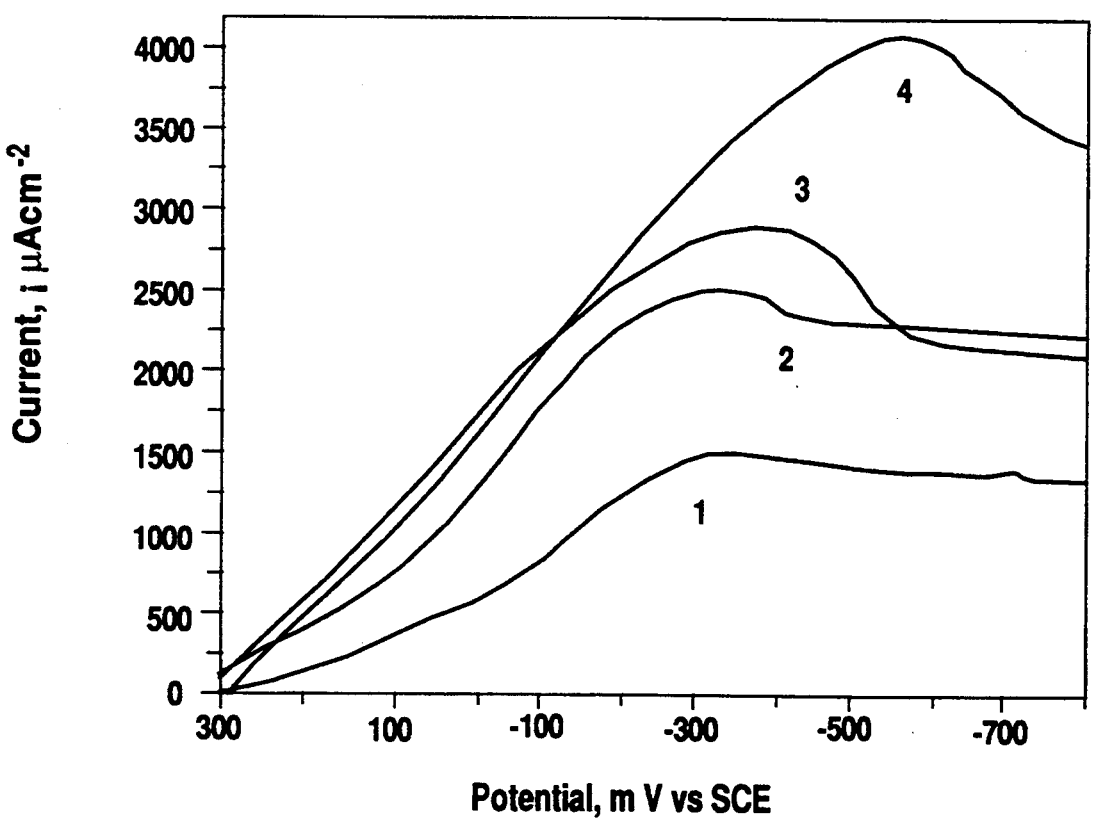

FIGS. 8A and 8B. Polarization curves for $O_2$ reduction at ppy-Pt (FIG. 8a) and ppy/Pt (FIG. 8b) electrodes. $O_2$-saturated 0.05M $H_3PO_4$ was used as the electrolyte. Other experimental conditions and sample notation as in FIG. 7.

Figure 9A:
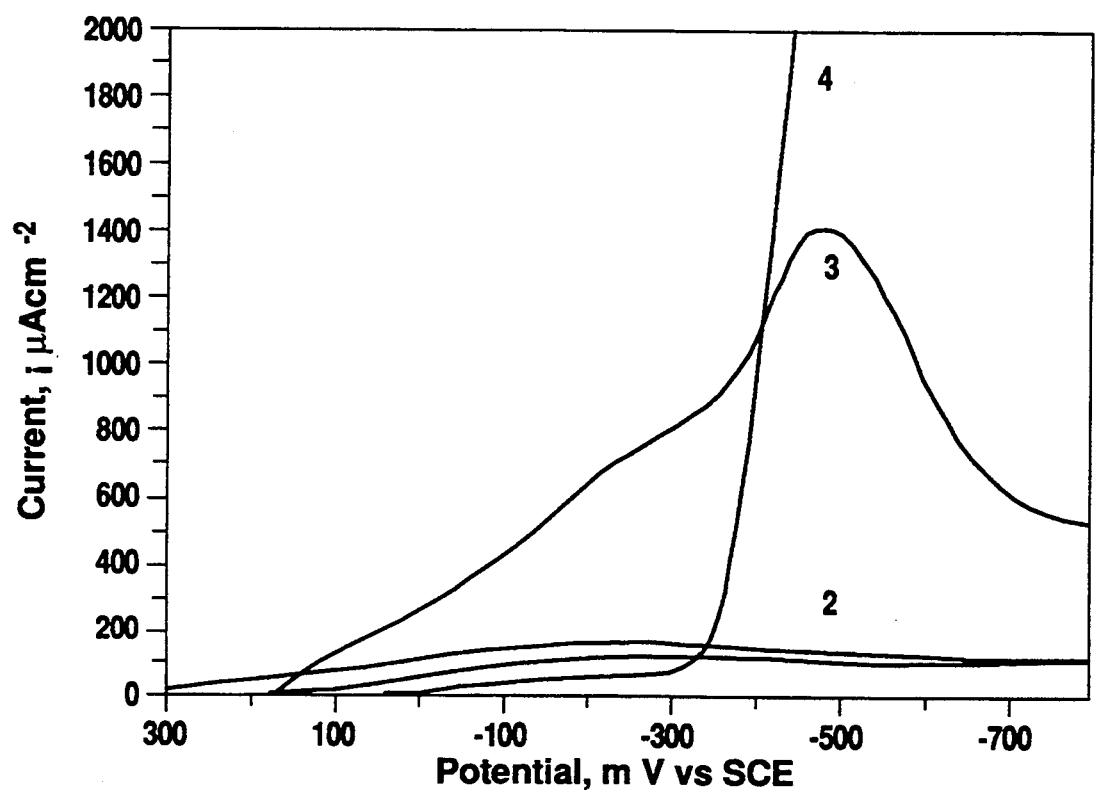
Figure 9B:
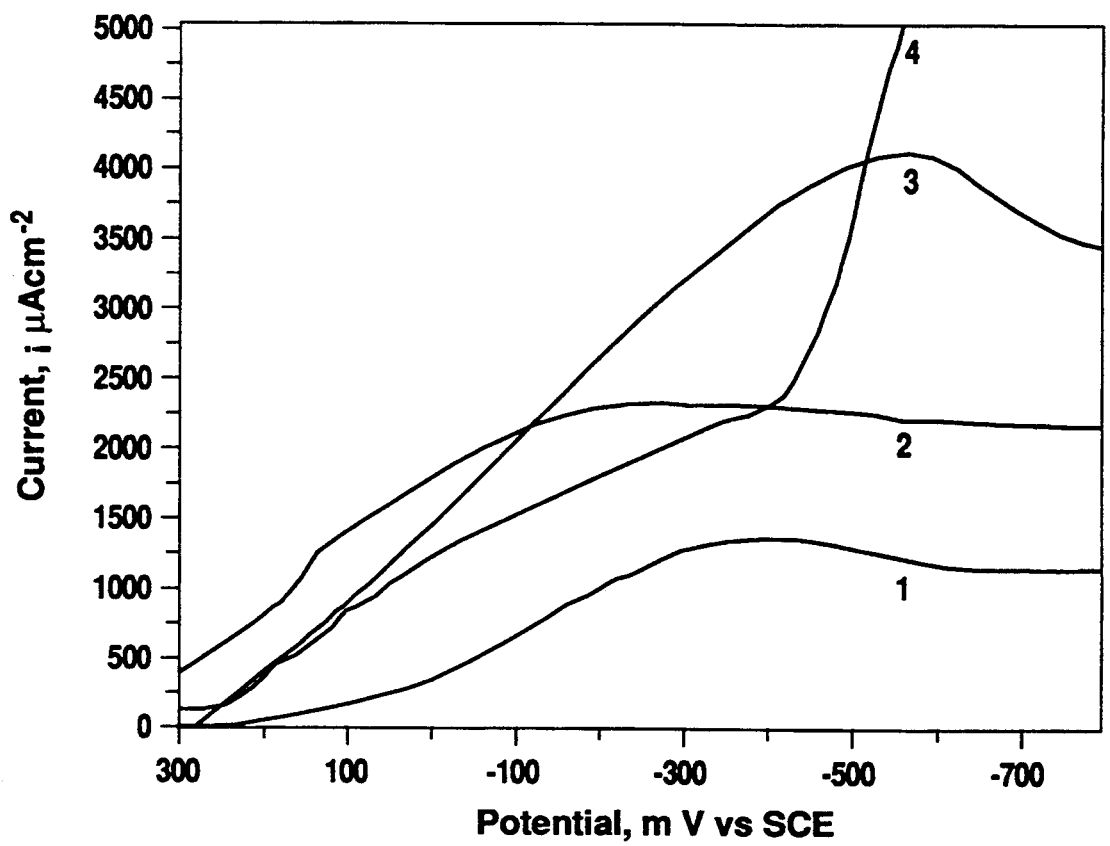

FIGS. 9A and 9B. Comparison of the electrocatalytic behavior of four types of films for here (FIG. 9a) and $O_2$-reduction (FIG. 9b). The data are taken from FIGS. 7 and 8 along with the curves for a Pt RDE. The sample notation is as follows: 1. ppy(1.1); 2. ppy(1.1)—Pt(0.071); 3. ppy/Pt(1.1); 4. massive Pt.

Figure 10:
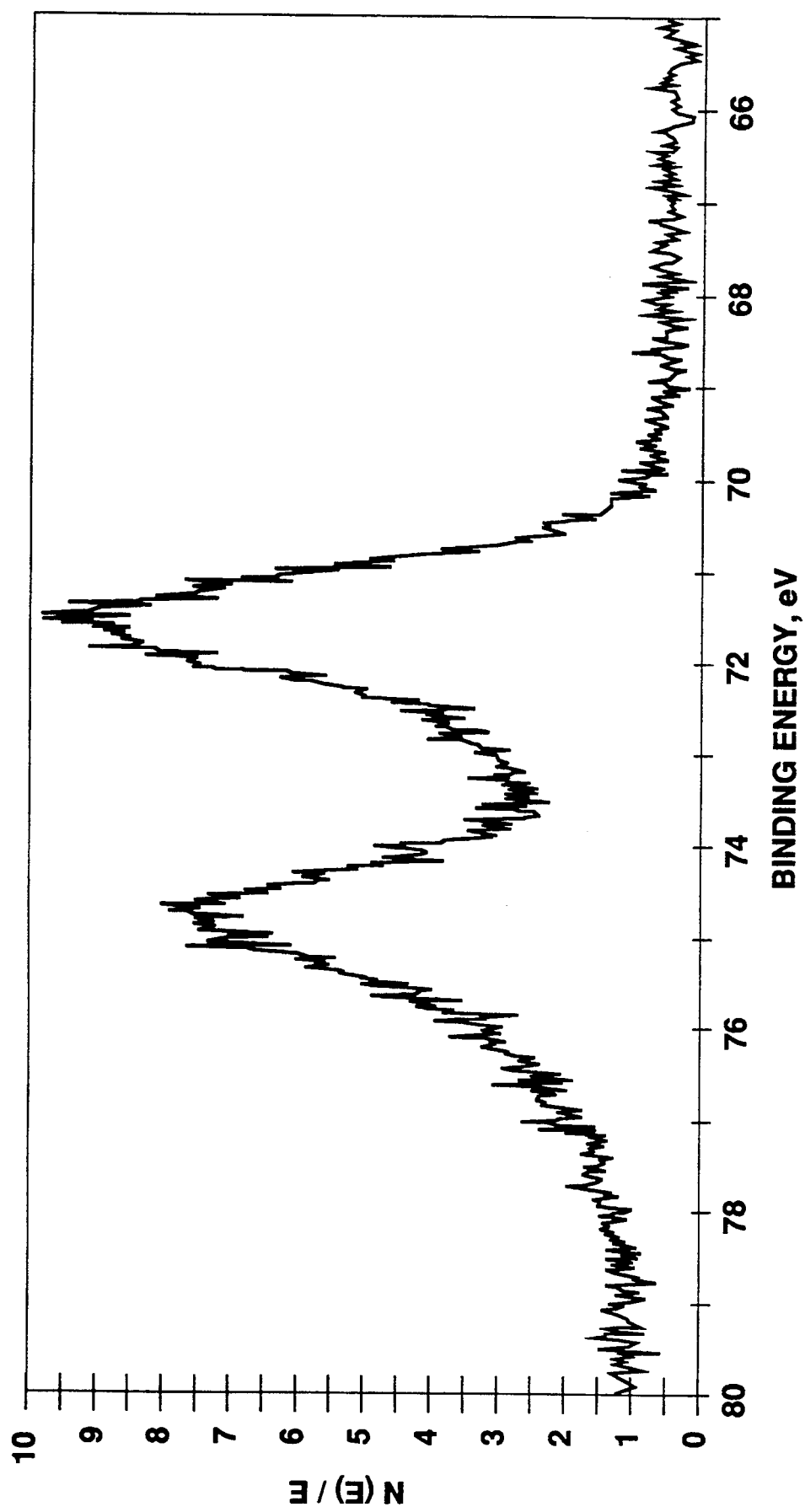

FIG. 10. X-ray photoelectron spectroscopy data (high-resolution scan) for a ppy/Pt thin film. This sample was generated from a 3 mM platinum solution.

Figure 11:

FIG. 11. A TEM photograph of a ppy/Pt sample similar to that considered in FIG. 10.

Figure 12:
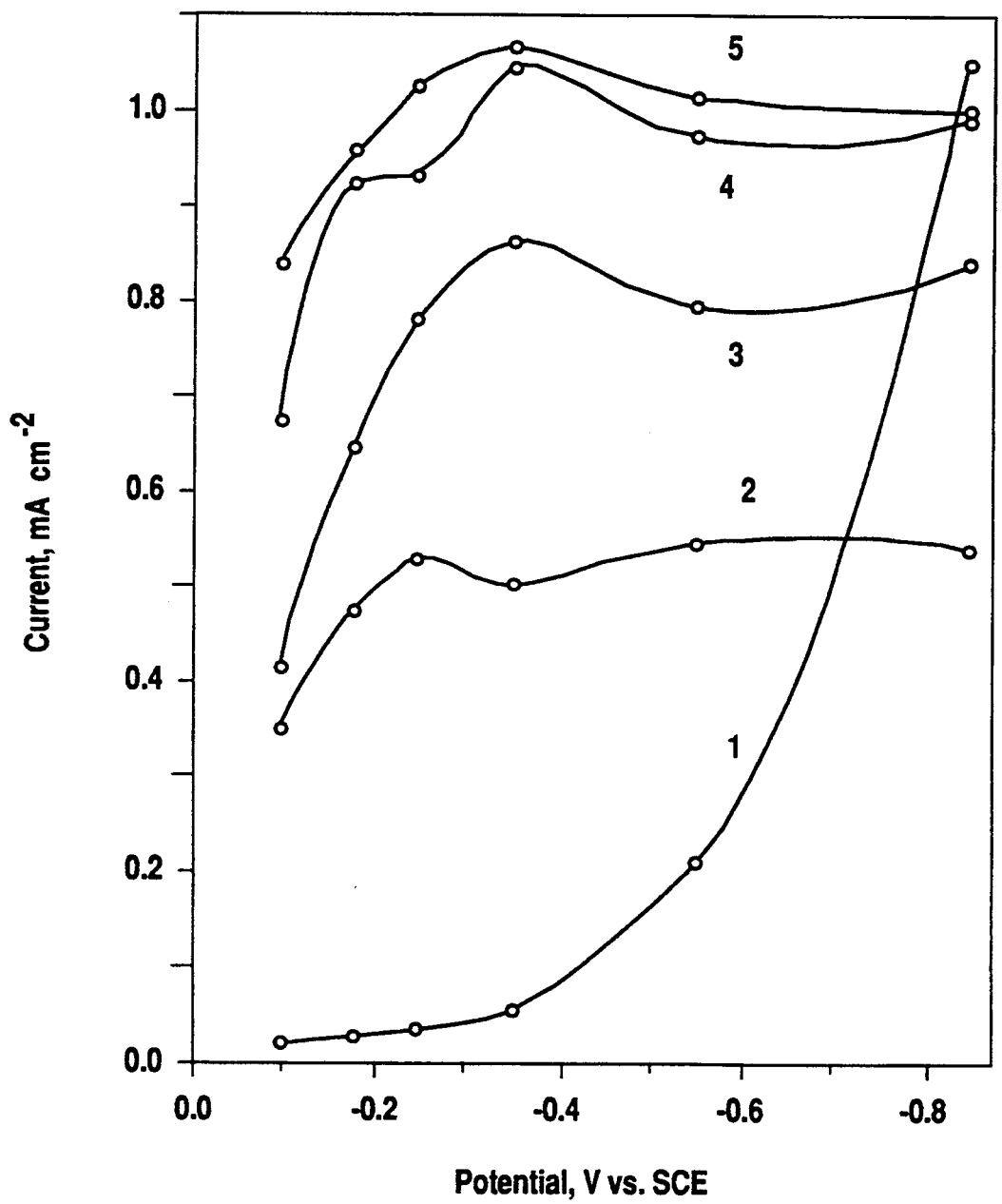
Figure 12A:
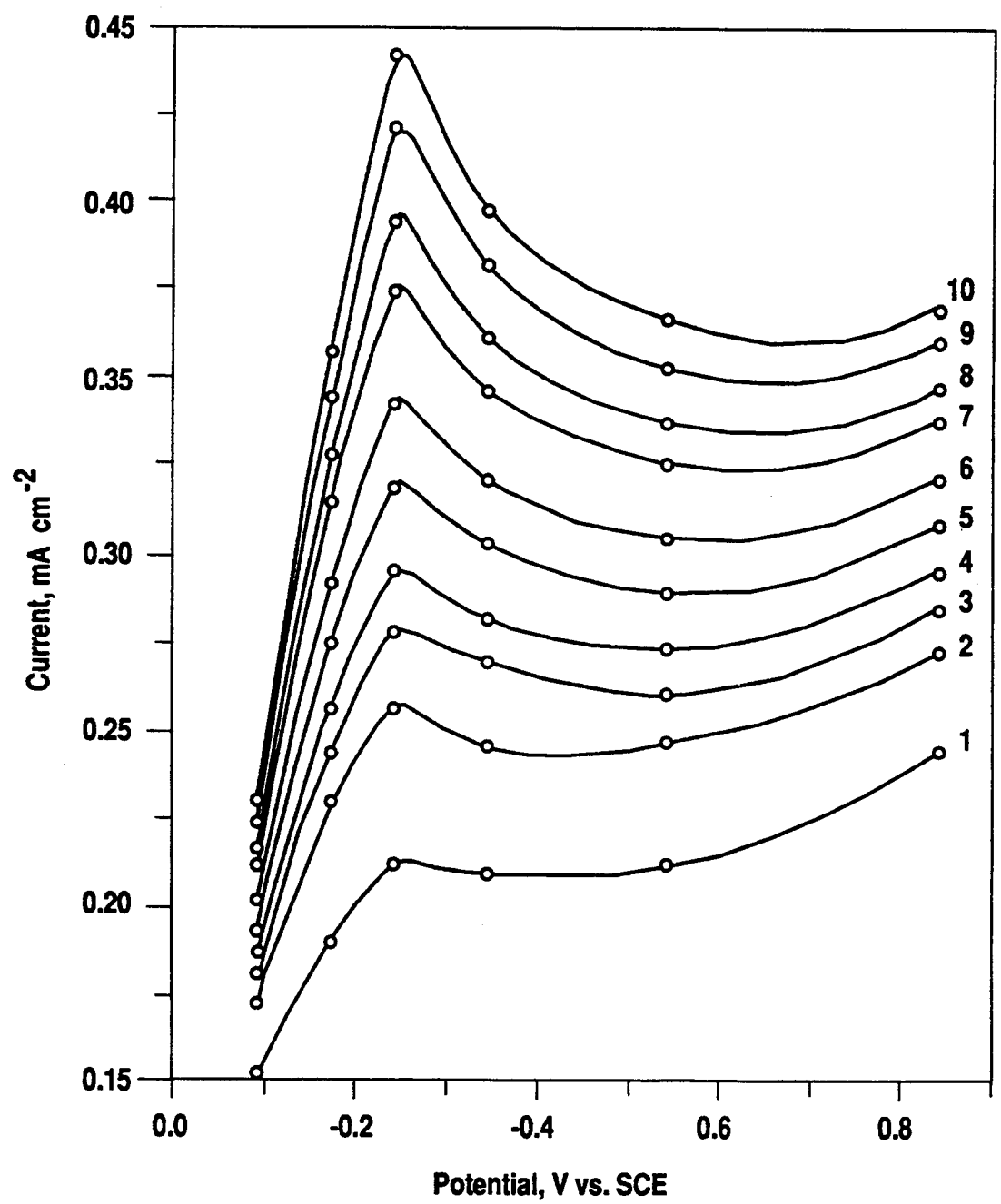

FIG. 12A. Polarization curves for the ORR at 1: glassy carbon, 2: ppy, 3: ppy/Pt/1, 4: ppy/Pt/2 and 5: ppy/Pt/3. In all cases, the thickness of the polymer film was kept constant at $\approx 3.6$ $\mu$m. The electrode rotation speed was 90 RPM.

FIG. 12A. Polarization curves for the ORR at a polypyrrole electrode (thickness: $\approx 1.0$ $\mu$m) at different rotation speeds (in RPM)—1: 10, 2: 20, 3: 30, 4: 40, 5: 60, 6: 90, 7: 110, 8: 250, 9: 490 and 10: 1000.

Figure 12B:
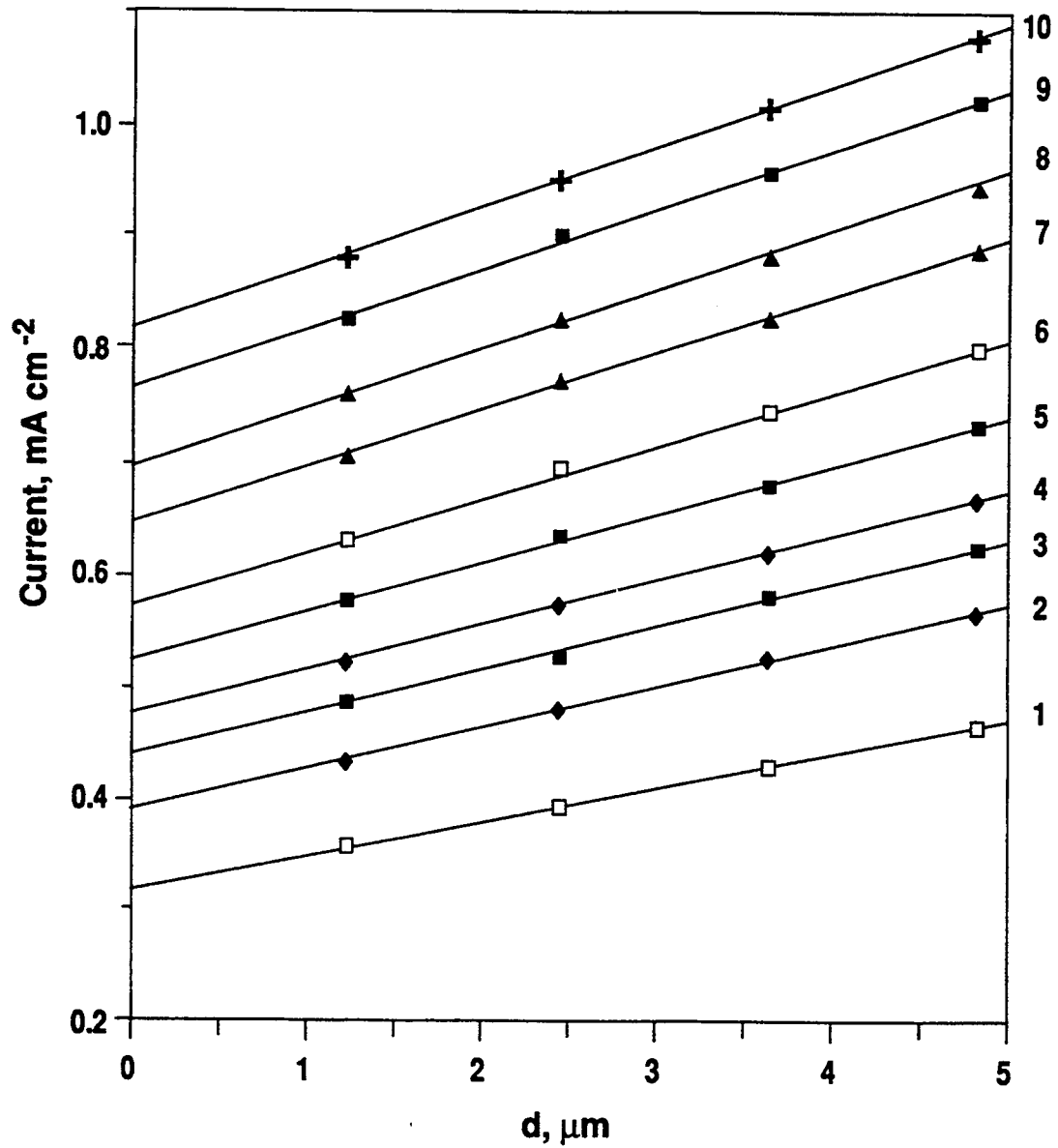

FIG. 12B. Variation of the background-corrected ORR current at a ppy/Pt/1 sample as a function of the polymer film thickness, d. The parameter is the electrode rotation speed, and the plot numbers correspond to those in FIG. 2. The lines are least squares fits of the data.

Figure 12C:
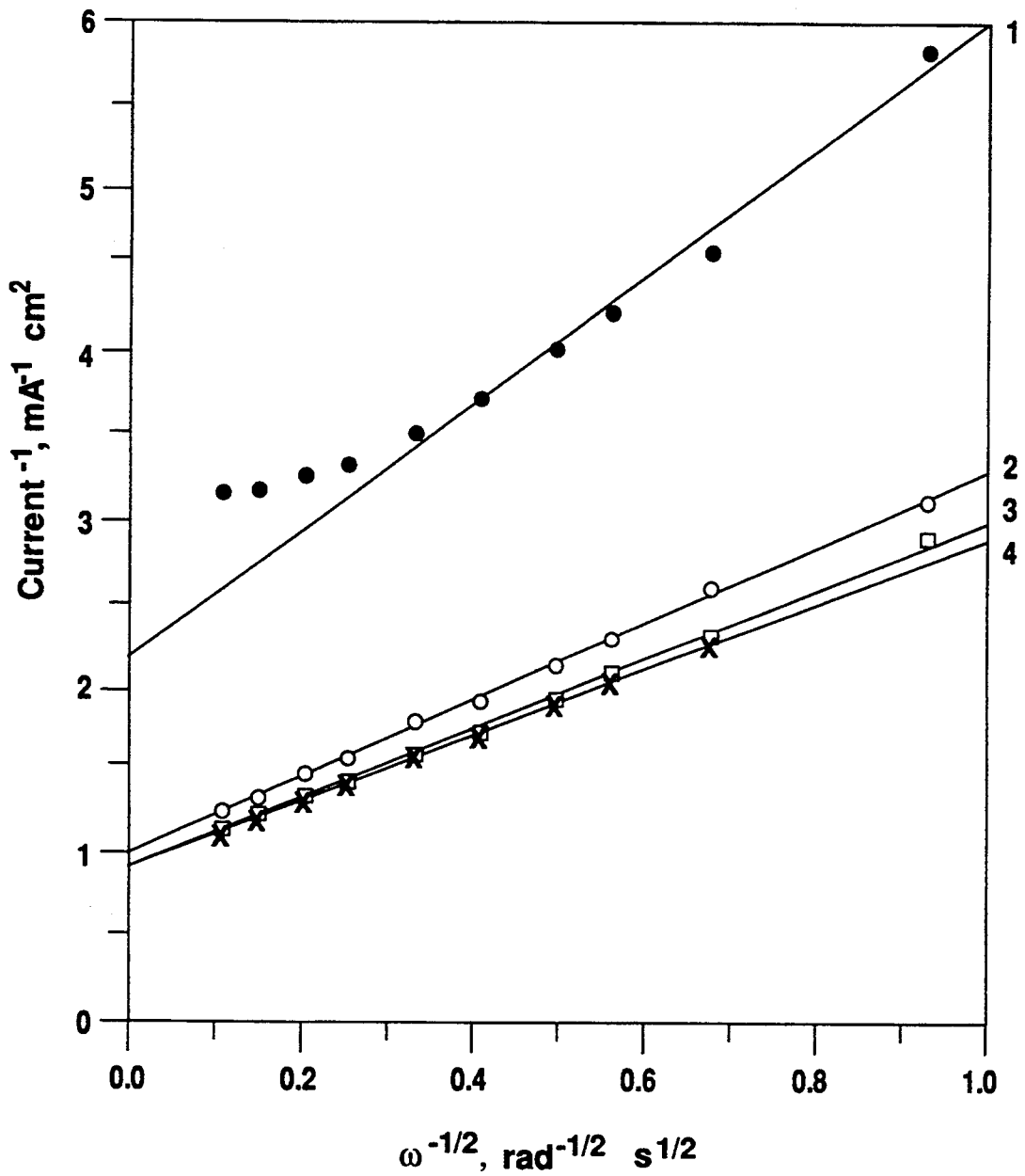

FIG. 12C. Koutecky-Levich plots for 1: ppy, 2: ppt/Pt/1, 3: ppy/Pt/2 and 4: ppy/Pt/3 constructed from data such as those in FIG. 3. The lines are least squares fit of the data except in the plot labelled "1" wherein the first four data points have been omitted.

Figure 12D:
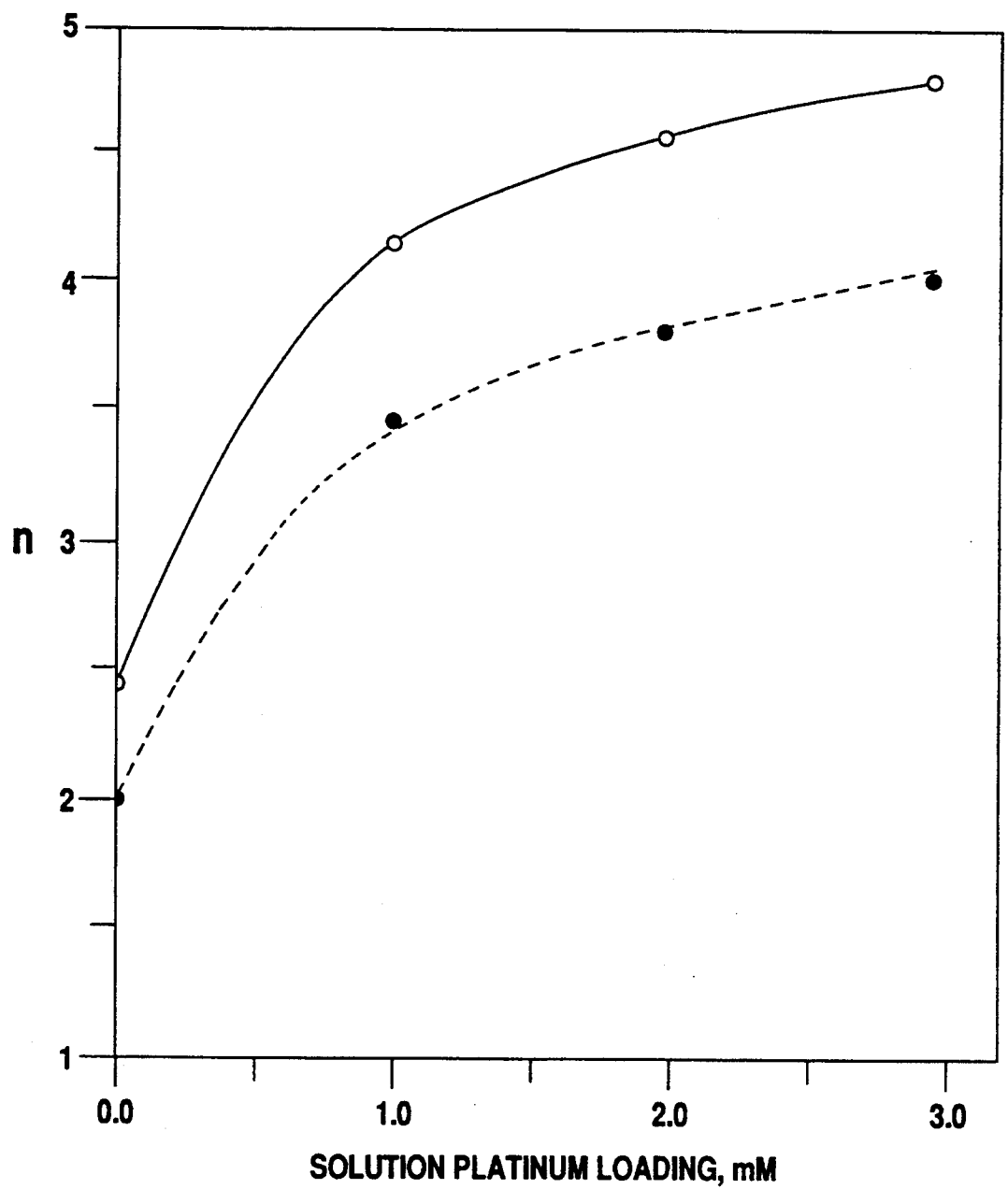

FIG. 12D. Variation of the electron stoichiometry, n with the solution platinum loading for the ORR. The values for n were computed from the Koutecky-Levich slopes. The dashed curve refers to data adjusted for polypyrrole surface roughness (see text). Both lines were simply drawn throughout the data.

Figure 12E:
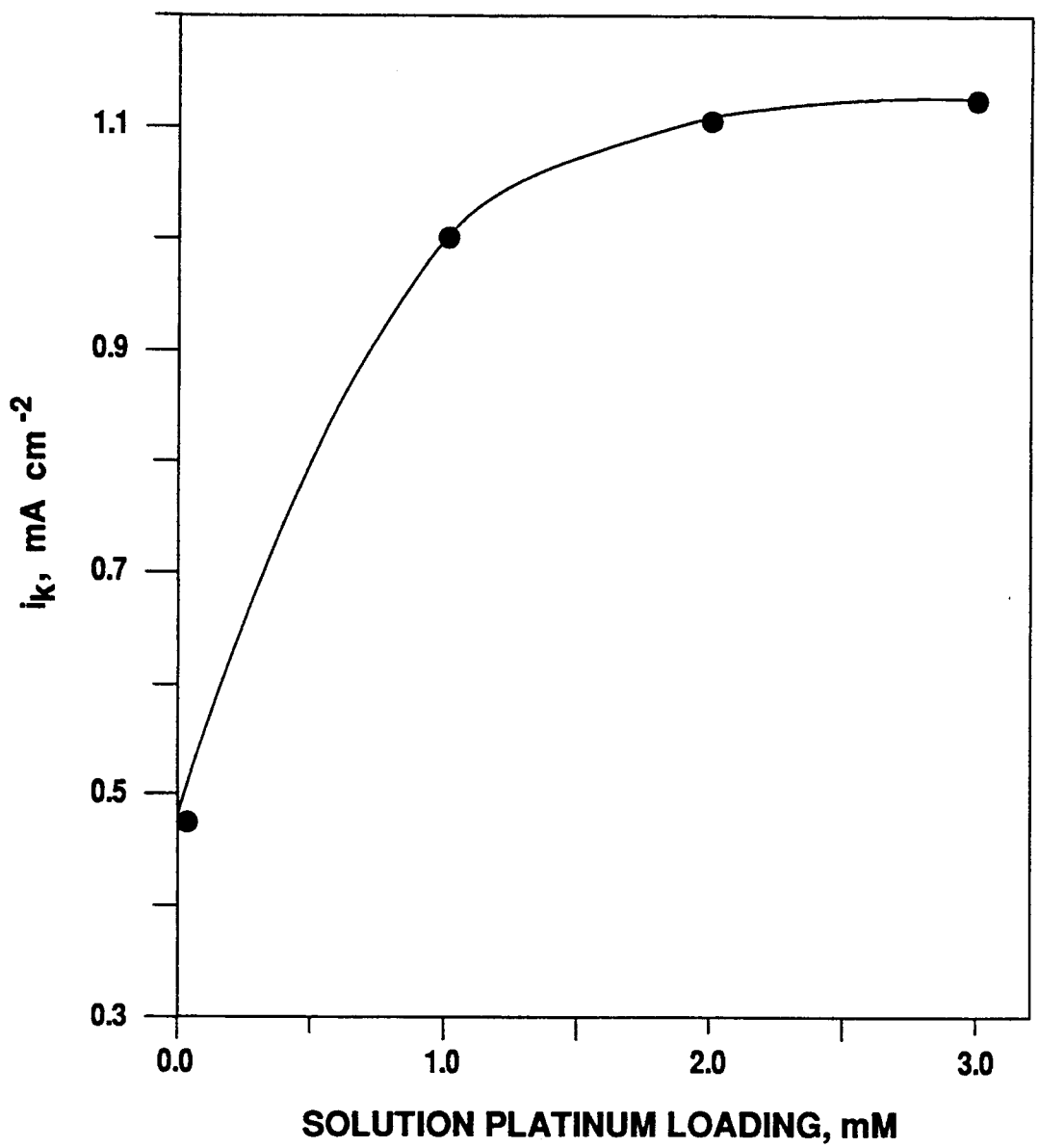

FIG. 12E. The variation of the kinetic current, $i_k$ (c.f. Eqn. 4) for the ORR with the solution platinum loading. Values for $i_k$ were obtained from the Koutecky-Levich intercepts. The line is imply drawn through the data.

Figure 12F:
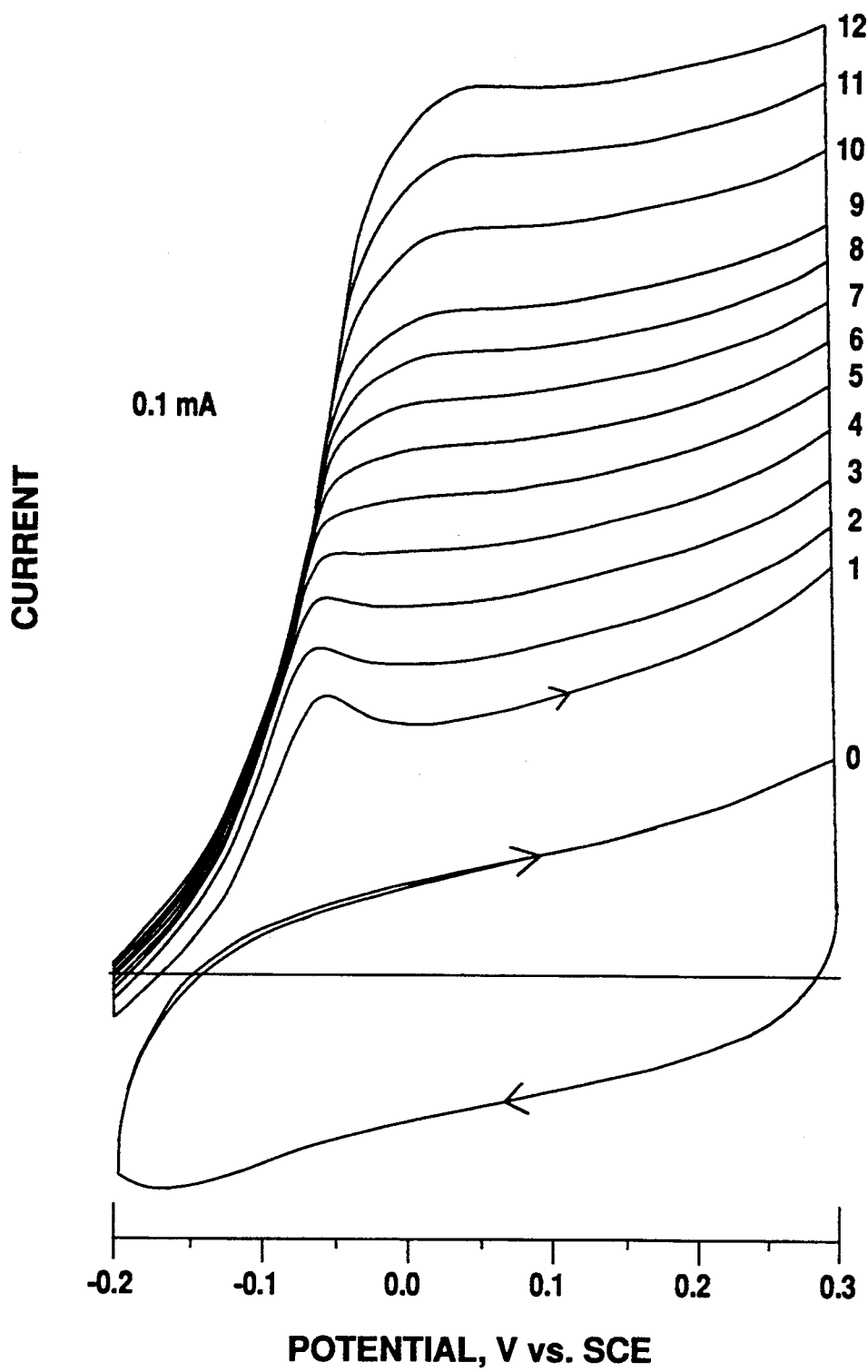

FIG. 12F. Polarization curves for the HOR at a ppy/Pt/2 electrode (polymer thickness: $\approx 2.5$ $\mu$m). The curve marked "0" is for the same sample in a $H_2$-free 0.5M $H_2SO_4$ electrolyte and was independent of the electrode rotation speed. The other curves for a $H_2$-saturated electrolyte are shown for varying electrode rotation speeds (in RPM): 1: 60, 2: 135, 3: 240, 4: 375, 5: 540, 6: 735, 7: 960, 8: 1215, 9: 1500, 10: 2160, 11: 2940 and 12: 3840. The horizontal line denotes zero current.

Figure 12G:
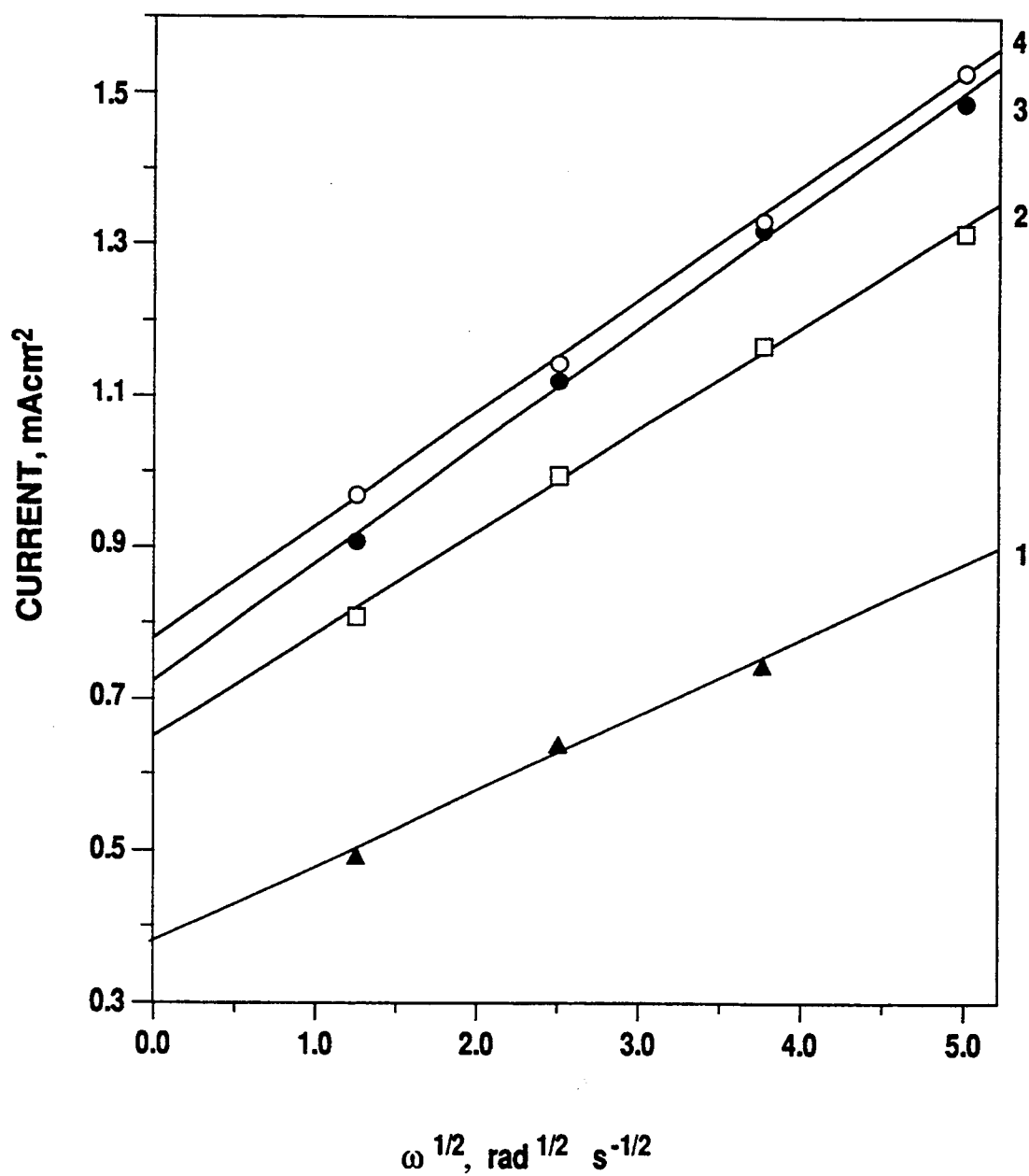

FIG. 12G. Levich plots of the HOR data for ppy/Pt/2 samples as a function of the polymer film thickness (in $\mu$m)—1: $\approx 1.2$, 2: $\approx 2.5$, 3: $\approx 3.6$ and 4: $\approx 4.9$. The currents were measured at 1.25 V (c.f. FIG. 7). The lines are least squares fits of the data.

Figure 12H:
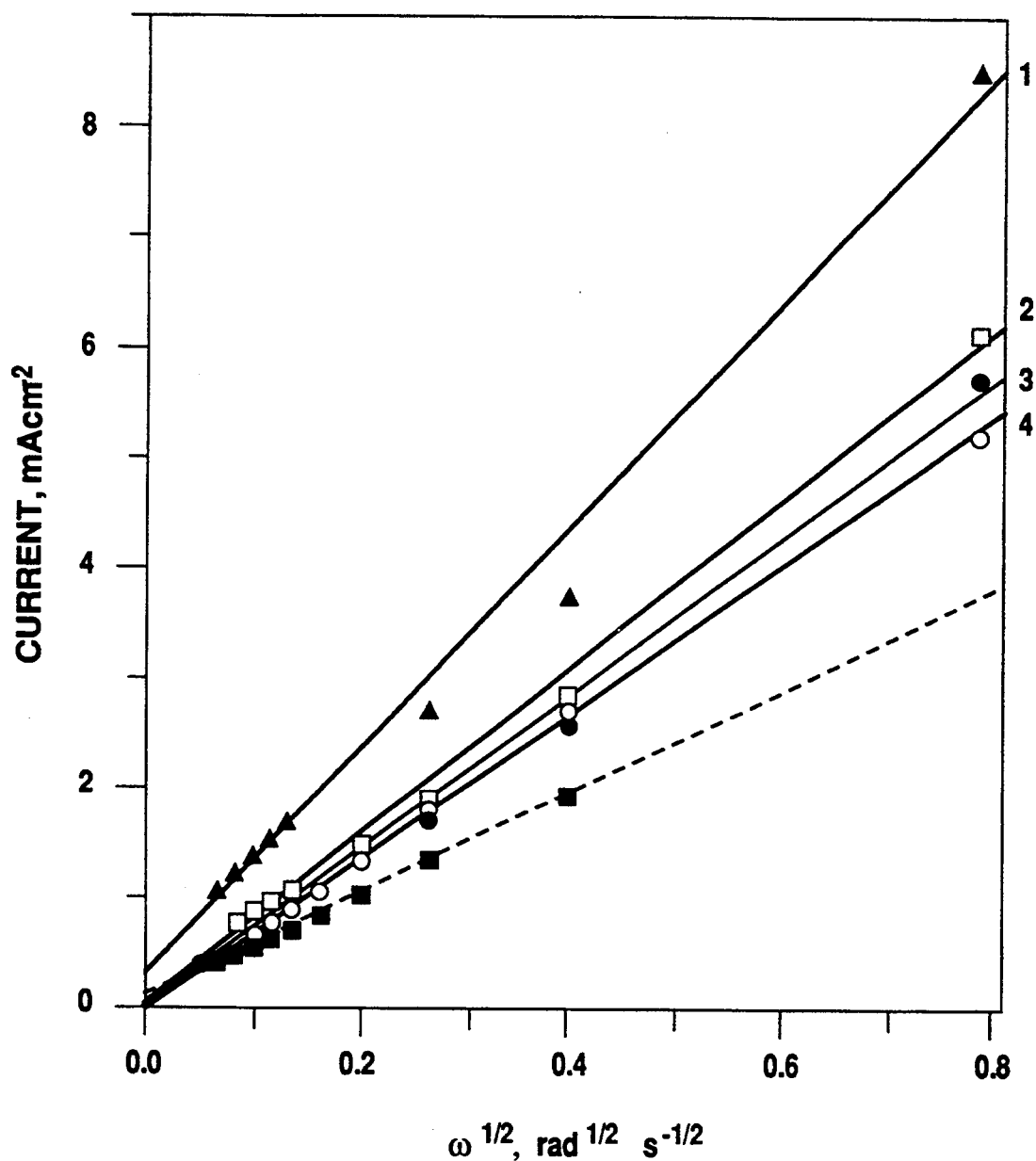
Figure 121:
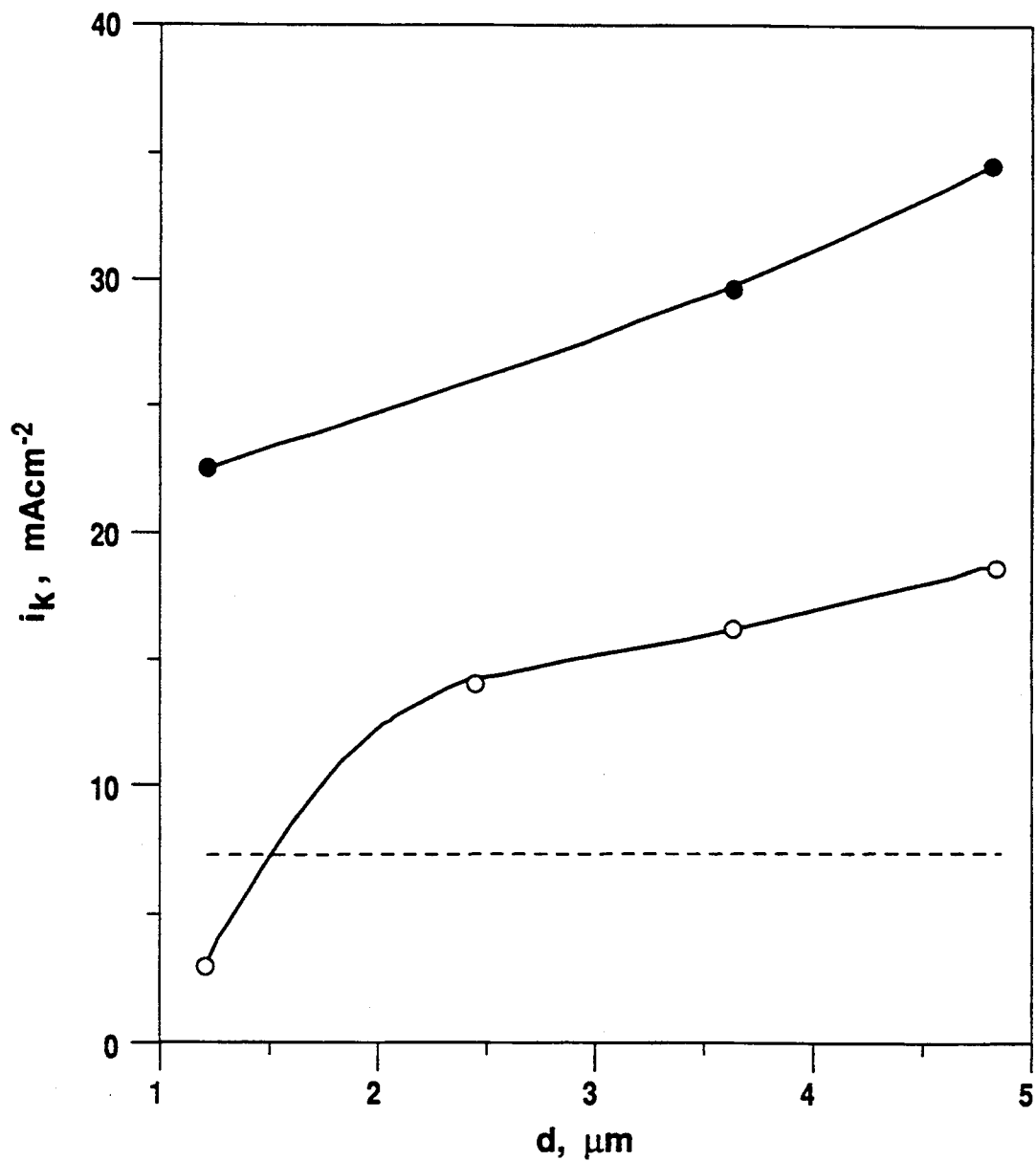

FIG. 12H. Koutecky-Levich plots of the HOR data for the ppy/Pt/2 samples considered in FIG. 8. In addition, the plot for a massive platinum electrode is also shown by a dashed line. The lines are least squares fits of the data.

FIG. 12I. Variation of the kinetic current, $i_k$ (c.f. Eqn. 4) with the polymer film thickness, d for the HOR. Data denoted by (○) and (●) are for ppy/Pt/2 and ppy/Pt/3 respectively. The dashed line refers to the value measured for the massive platinum "reference" (c.f. FIG. 9). Values for $i_k$ were obtained from the Koutecky-Levich intercepts. The lines are simply drawn through the data.

Figure 12J:
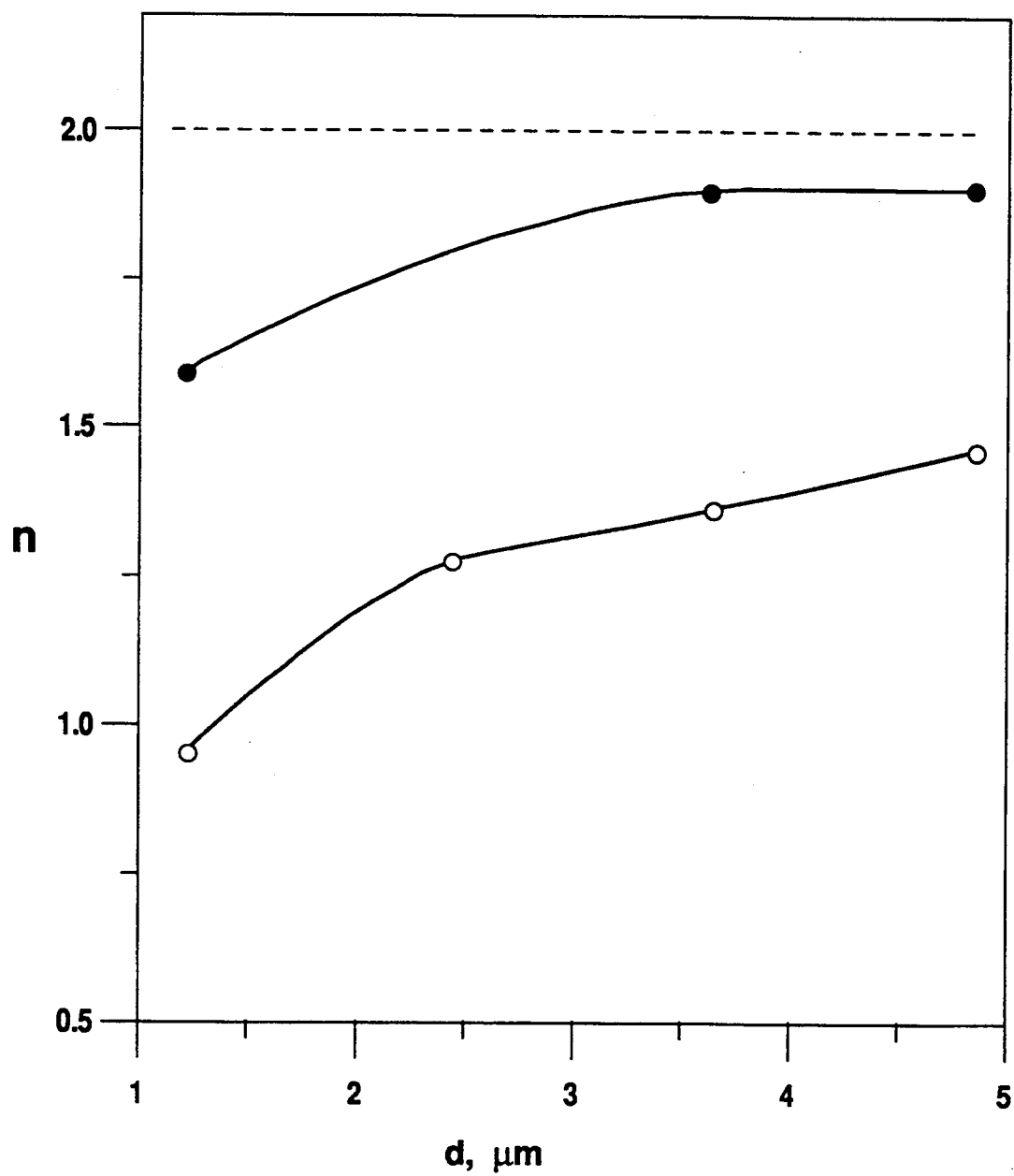

FIG. 12J. Variation of n for the HOR with the polymer film thickness, d. The data symbols and other details as in FIG. 12I.

FIGS. 13A and 13B. (13A) Cyclic voltammograms (potential scan rate: 10 mV/s) in 0.1M $K_2SO_4$ for various polypyrrole films on a glassy carbon support. Curve (i) corresponds to a sample electrochemically grown from 0.1M $K_2SO_4$ at +850 mV (growth charge: 3455 mC/cm$^2$). Curves (ii)→(v) correspond to composites containing chemically synthesized polypyrrole and a carrier polymer which was Nafion ® in Curves (ii)→(iv) and PVC in Curve (v). The polypyrrole loading in the composite was 79, 102, 196 and 96 $\mu$g in Curves (ii), (iii), (iv) and (v) respectively. The current scale, S, is 12 $\mu$A in (i) and 60 A in all the other cases. The dashed line in each curve represents zero current.

(13B) Plot of the anodic charge vs. polypyrrole loading in the composite. The charge was obtained via integration of the voltametric wave such as those shown in FIG. 1a. The symbols (○) and (△) denote Nafion ®-polypyrrole composite made from a mixture containing the two polymers in 2:1 and 1:1 weight ratio respectively. Data shown as ($\triangledown$) are for polypyrrole films grown electrochemically as specified above and in the text. The quantity of polypyrrole in these latter cases was estimated from Faraday's law using n=2.21 and the molar mass of 74.89 g/mol obtained from elemental analyses (see above).

Figure 13C:
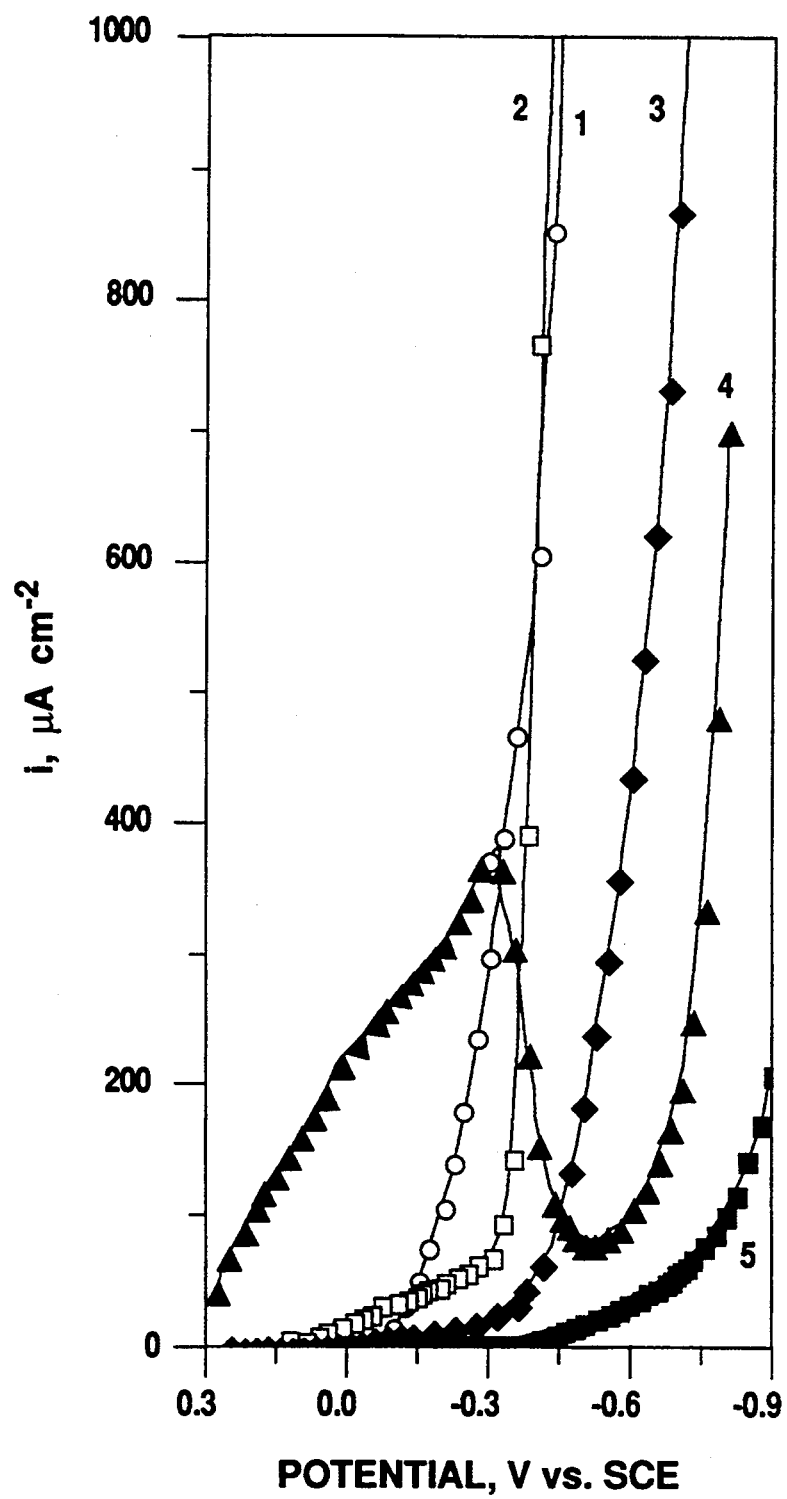
Figure 13D:
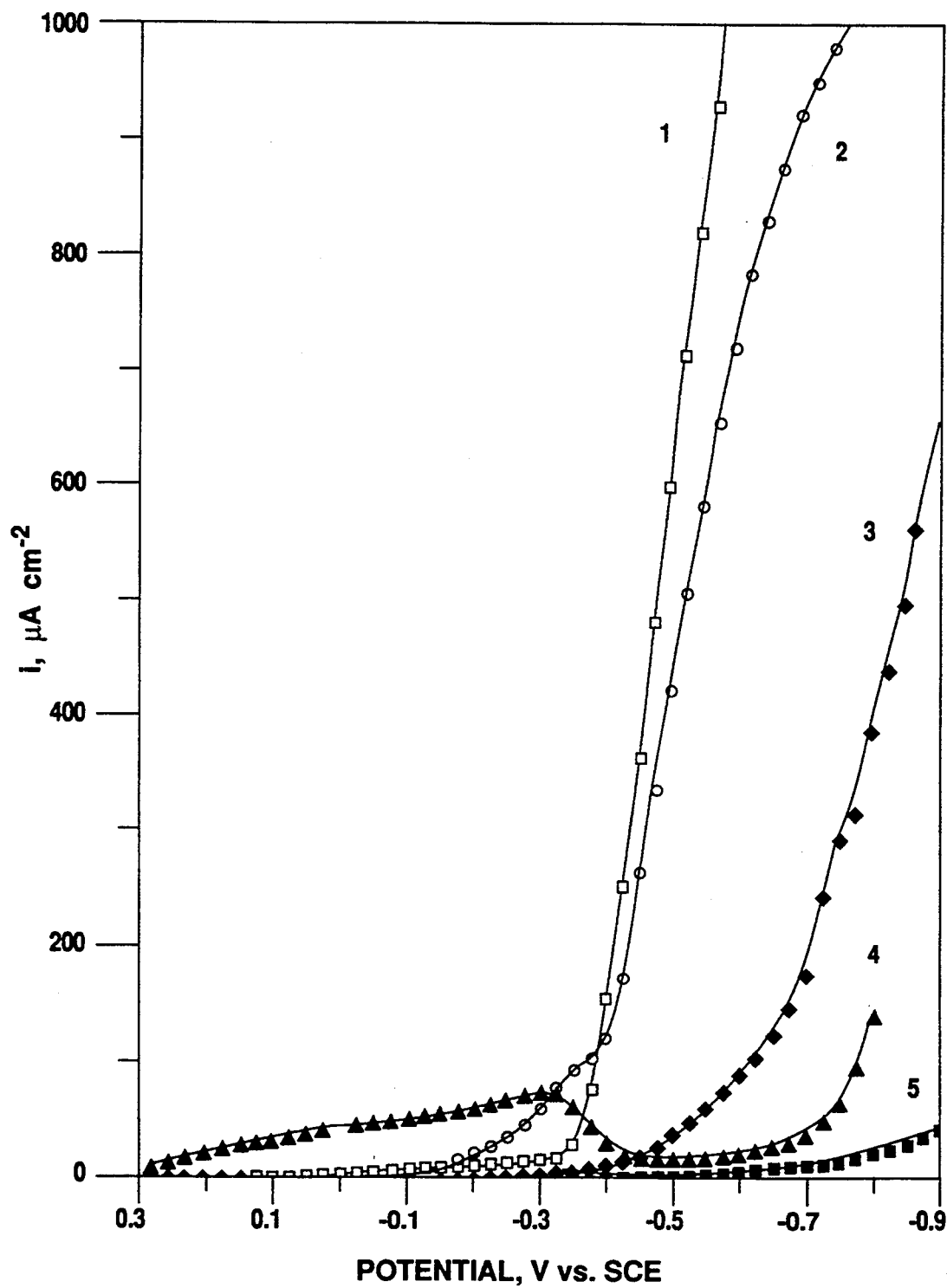

FIG. 13D. Polarization curves (electrode rotation speed: 500 RPM) for various polypyrrole and control samples for the HER in $N_2$-saturated 0.05M $H_3PO_4$. Curves 1–5 correspond to a massive Pt electrode; a Nafion ®-polypyrrole composite modified with colloidal $Pt^0$, Nafion ® a Nafion ®-polypyrrole composite wherein the $Pt^0$ was omitted and the glassy carbon support electrode respectively. The colloidal $Pt^0$ loaded Nafion ®-polypyrrole composite was prepared by adding pyrrole (0.33M) to 100 mL of platinum colloidal solution (obtained by mixing 0.25 g $K_2PtCl_6$ with 0.1 g sodium citrate). The resultant mixture was vigorously stirred for $\approx 12$ hr. at room temperature. The oxidizing agent for pyrrole in this case was the unreacted (excess) $K_2PtCl_6$ in the colloidal solution. The platinum-loaded polypyrrole was processed with Nafion ® as before. The $Pt^0$ content in the sample in Curve 2 was 30% (by wt. from X-ray photoelectron spectroscopy analyses) and the Nafion ® content in the composites was $\approx 32$ wt. %. FIG. 13C is an amplification of the early part of the current-potential profiles.

DESCRIPTION OF PREFERRED EMBODIMENTS

The present inventors' approach combines the positive features of both homogeneous and heterogeneous catalyst systems by distributing the catalyst particles in a three-dimensional (3-D) array within a conducting polymer matrix. In this manner, the present inventors are able to enhance the dimensionality of the catalyst particles relative to the usual (two-dimensional) surface-confined catalyst situation. The two approaches are contrasted in FIGS. 1A and 1B.

Using the 3-D approach, the present inventors are able to enhance reaction cross-sections by increasing the thickness (i.e., the effective reaction volume) of the polymer film—a strategy which is futile with the 2-D surface situation. Thus, the present inventors' experiments with proton and $O_2$ reduction show no saturation in reaction rates with increasing polymer film thickness as observed with conventional polymer electrode/catalyst systems.

The second novel feature of the present inventors' approach lies with the use of colloidal metal particles within the polymer matrix. The present inventors have accomplished this be growing the conducting polymer film from an electrodeposition bath containing colloidal catalyst particles. These particles apparently are "electrotrapped" within the growing polymer matrix. The present inventors have evidence from transmission electron microscopy that these particles are indeed in the catalytically useful nm size range. Further depth profiling using X-ray photoelectron spectroscopy shows no change in the catalyst concentration with depth into the polymer film, attesting to the present inventors' success in achieving the 3-D array schematized in FIG. 1B.

The present inventors have completed sets of experiments to probe the catalytic activity of their "nanocomposite electrocatalysts." They have used polypyrrole-containing Pt catalysts as a model system. In further tests, the catalytic activity of this system towards proton and $O_2$ reduction was compared with polypyrrole films atop which a comparable a mount of Pt was electrodeposited in the usual manner. (This corresponds to the surface 2-D system schematized in FIG. 1A.) Order of magnitude enhancement in catalytic activity was observed with their new materials relative to the 2-D system. Further, as noted earlier, no saturation in this reaction rate enhancement with increasing film thickness was noted unlike in the latter case.

Figure 1A:
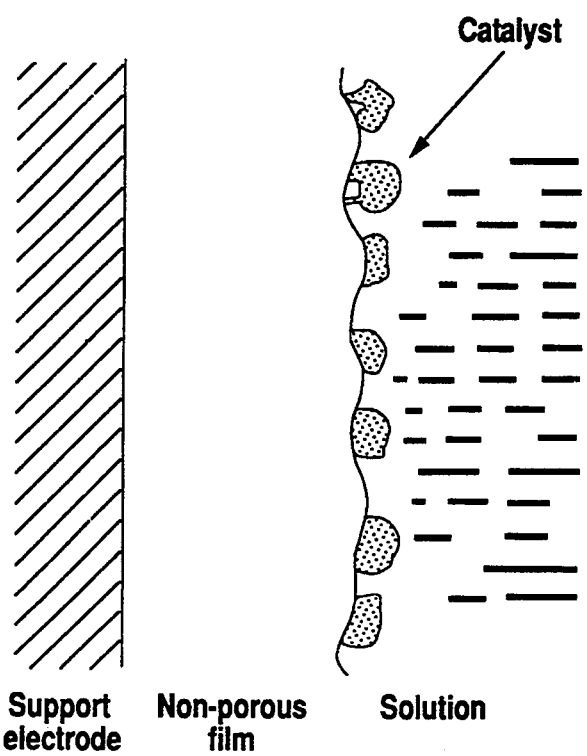
FIGS. 1A and 1B. Comparison of a ppy/Pt nanocomposite electrode containing a 3-D array of $Pt^0$ colloidal particles within the polypyrrole matrix (1A) with a surface-confined catalyst configuration (1B). In both cases, the catalyst distribution as shown in highly schematized.
Figure 1B:
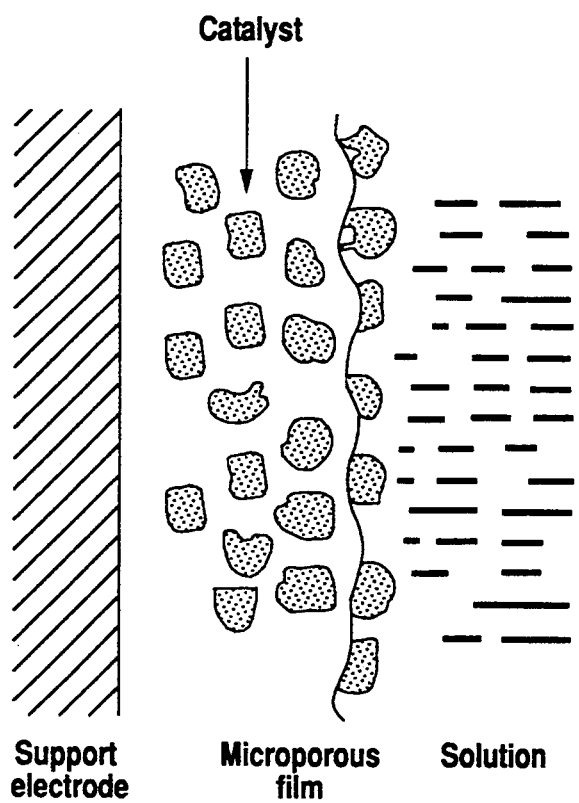

A further comparison has been made with the catalytic activity of bulk (massive) Pt. Thus, for the hydrogen evolution reaction at a certain overpotential (e.g., $-400$ mV vs. saturated calomel), the catalytic activity of the present inventors' materials and bulk Pt is the same. Stated in different terms, the present inventors observe comparable catalytic activity by immobilizing only $\approx 4\%$ of the corresponding amount of Pt in a bulk electrode, in a 3-D array within the polypyrrole matrix. Thus, it makes economic sense to disperse the (expensive) catalyst particles in a polymer matrix. The bonus with the use of an electronically-conductive polymer matrix (such as polypyrrole) is that it provides an efficient route to the shuttling of electronic charge between the underlying (support) electrode (c.f. FIG. 1B) and the catalyst reaction centers.

These new materials are particularly suitable for application in devices including fuel cells and toxic waste disposal reactors.

Polypyrrole films containing nanometer-sized Pt particles (ppy/Pt) were electrosynthesized at glass, carbon and gold electrode surfaces. This was done either by voltametric cycling between $+0.95$ V and $-0.80$ V (vs. Ag/AgCl) or via a potential step technique in solutions containing colloidal $Pt^0$ particles. A chloroplatinate medium with a citrate reducing/protection gent was employed for generating the colloids. An "electrotrapping" mechanism is proposed wherein the (negatively-charged) Pt colloidal particles from a three-dimensional array within a growing polypyrrole matrix. The growth of the ppy/Pt films was studied by combined voltametry-electrochemical quartz crystal microgravimetry. Quantitative analyses of the data afforded estimates of the $Pt^-$ loading within the ppy matrix and the polymerization efficiency. The former are compared with assays via X-ray photoelectron spectroscopy. The ppy/Pt films exhibited unusually high catalytic activity towards the hydrogen evolution reaction (HER) and $O_2$ reduction. The enhanced activity is attributed to the fine (nm size range) dispersion of the Pt catalyst particles with in the ppy matrix. Comparisons with bulk Pt and $Pt^0$ electrodeposited on the surface of ppy films are provided. Thus, for the HER at a potential of $-400$ mV (vs. SCE), the ppy/Pt samples show comparable catalytic activity with bulk Pt and an order of magnitude rate enhancement relative to the surface $Pt^0$-ppy case. Correspondingly, the rate enhancement does not saturate with increasing film thickness for the present inventors' ppy/Pt samples. This behavior contrasts with that characteristic of surface-confined catalyst situations. That the $Pt^0$ particles within the ppy matrix truly are in the catalytically useful nm range (e.g., $\approx 10$ nm) is demonstrated by transmission electron microscopy data.

A major handicap with heterogeneous catalysis vis-a-vis its homogeneous counterpart is the reduction in the dimensionality in the former case (Anson). That is, exposure of the catalyst to the substrate is better facilitated in the homogeneous (solution) case. The use of a microporous polymer (such as polypyrrole) within which colloidal $Pt^0$ (or similar) catalyst particles are embedded (FIG. 1B), offers an effective solution to this problem as the present study demonstrates. The microporosity of the polymer support, in this approach, is designed to afford good permeation of the substrate such as $O_2$, and correspondingly respectable reaction cross-sections. An added advantage with the use of a microporous matrix is that is large surface area results in reducing the reaction overpotentials—a strategy that is well exemplified by the use of porous electrodes in industrial electrolytic processes.

Polypyrrole (ppy) films containing a three-dimensional array of nanometer-sized platinum catalyst particles have been developed by the present inventors. The catalytic activity of these "nanocomposite" (ppy/Pt) films towards the dioxygen reduction reaction (ORR) and the hydrogen oxidation reaction (HOR) were tested in 0.05M $H_3PO_4$ and 0.5M $H_2SO_4$ respectively with the polymer film thickness and platinum catalyst loading as variables. In both cases, an increase in the reaction cross-section with the polymer film thickness was noted consistent with the facile permeation of the substrates into the polymer-catalyst framework. The hydrodynamic voltametry data were analyzed and found to be diagnostic of rate control being exercised by the bimolecular catalyst-substrate charge transfer reaction for both the ORR and HOR cases. For the HOR case, the ppy/Pt films exhibited a remarkable enhancement (5×) in the reaction rate relative to a massive platinum comparison standard which could be attributed to either a more efficient dispersion of the catalyst particles in the ppy/Pt cases or to a (polymer) substrate-catalyst interaction. While polypyrrole itself showed negligible catalytic activity towards the HOR, the ORR proceeded at a remarkably fast rate at the polymer matrix even in the absence of the platinum catalyst. Comparisons with available data on the ORR and HOR at other types of platinum modified polypyrrole samples are presented herein.

Perhaps the most interesting contrast in the behavior of the present inventors' ppy/Pt samples towards the ORR and HOR lies with the matrix itself—i.e., polypyrrole has a non-negligible catalytic activity towards the ORR whereas it is catalytically inactive in the HOR case. The chemical origin of this contrasting behavior of polypyrrole towards the two substrates is not presently understood. Nonetheless this variant behavior has prompted the present inventors to analyze the data for the two reactions in a somewhat different manner. In a mechanistic sense, however, there are similarities in the two reaction systems in that the rate control appears to be exercised in both case by charge transfer between the substrate and the catalyst particles.

Analytical expressions have been derived by Lyons et al. (1989 and 1991) for quantifying the transport and kinetics in conducting polymer modified electrodes containing a homogeneous distribution of catalyst particles. Four cases were discussed by these authors. Case I pertains to very thin films with complete permeation of the substrate and fast reaction kinetics at the catalyst particle surface leading to diffusion-limited behavior. In Case II, the substrate still penetrates through the film but now the reaction at the catalyst particle is rate-limiting. It appears that the present inventors' experimental results on ORR and HOR are best explained by this case. Cases III and IV are characterized by reaction layer thicknesses which are small relative to the film thickness; the reaction rates again being limited by diffusion and kinetics respectively. In a more recent study (Lyons et al., 1991), the same group has presented a model for a conducting polymer based electrochemical sensor operated in the steady-state RDE model. Two cases were discussed leading to diffusion-limited and kinetically controlled fluxes within the polymer film. In both Case II above, Lyons et al. (1989), and the latter case, Lyons et al. (1991), the flux and current are predicted to depend in a first-order manner on the film thickness as is indeed observed in this study.

The present study clearly has shown new evidence contradicting the previous assertion (Holdcroft et al.) that "conducting polymer containing particulates, while possessing rapid electron transfer and electron propagation kinetics, are inefficient three-dimensional catalytic systems due to poor polymer porosity." Specifically, the results presented herein illustrate that efficient three-dimensional assemblies may be constructed such that they exhibit, in addition to rapid charge transfer through the polymer matrix, reaction fluxes that are not limited by film thickness. However, this optimism must be tempered by the range of potentials that can be accessed with a conducting polymer such as polypyrrole. Thus reaction rate limitations exercised by the poor electronic conductivity of the polypyrrole matrix at potentials negative of $\approx -0.30$ V, have been observed both in this study as well as in the present inventors' previous work. Reactions in the positive potential regime may also be precluded—in this case, by the proclivity of polypyrrole to undergo chemical and electrochemical degradation. However, this is not a problem with the HOR because of the relatively low potential at which this process occurs.

EXAMPLE 1

Efficient Electrocatalyst Assemblies for Proton and Oxygen Reduction: The Electrosynthesis and Characterization of Polypyrrole Films Containing Nanodispersed Platinum Particles

Experimental

Chemicals

Pyrrole, sodium citrate, KCl and $K_2PtCl_6$ were from Aldrich and phosphoric acid was MCB (ACS Reagent Grade). Pyrrole was purified by passage through a pasteur pipet microcolumn containing glass wool and activated $Al_2O_3$. Double-distilled water was used for the preparation of all solutions. Nafion ® was a 5 wt % solution of perfluorinated ion exchange powder in a mixture of lower aliphatic alcohols and 10% water (Aldrich #27,470-4).

Electrochemical Cells and Accessories

The cell for cyclic voltametry was standard; the working electrode was either glassy carbon (Bioanalytical Systems, 0.07 cm$^2$ geometric area) or Au (see below). The surface in the former case was polished to a mirror finish with $Al_2O_3$ slurry down to 0.05 $\mu$m on a microcloth (Buehler) followed by sonification for a few minutes in distilled water.

The cell design for electrochemical quartz crystal microgravimetry (EQCM) was similar to that described by previous authors (Baker et al.). A 5 MHz AT-cut quartz crystal (Valpey-Fisher) with Au deposited on either side served as the working electrode. This was clamped via an O-ring seal such that the area exposed to the solution (0.7 cm$^2$) was less than the oscillation area. For hydrodynamic (rotating disk electrode, RDE) voltametry, a glassy carbon electrode (0.206 cm$^2$ geometric are) was again used. Either a Ag/AgCl electrode or a saturated calomel electrode (SCE) (Bioanalytical Systems) was used as reference; all the potentials in this study are quoted with respect to Ag/AgCl unless otherwise specified. A Pt wire was used as the auxiliary electrode in all the cases.

Equipment

A Bioanalytical Systems Model CV-27 potentiostat was used for cyclic voltametry on glassy carbon and related experiments. RDE experiments utilized a Pine Instrument Co. Model RDE 4 bipotentiostat and a Model MSRX rotor. Coulometry was performed on an Electrosynthesis Inc. Model 640 digital coulometer.

A JEOL JEM-1200 EX instrument was used for transmission electron microscopy (TEM). Scanning electron microscopy (SEM) utilized a JEOL JSM-35C system. Energy-dispersive X-ray analyses were performed on this instrument using a Tracor Northern 2000 accessory module. A Physical Electronics Model 5000 C system fitted with an Al anode (1486.6 eV) and a 4 keV Ar+ ion sputter gun was used for X-ray photoelectron spectroscopy (XPS). The sputter rate was calibrated with a $SiO_2$ standard.

The EQCM apparatus utilized two quartz crystals connected through two separate oscillator circuits. Such a differential circuit for monitoring the frequency differences (the reference crystal oscillated in air at its natural frequency ±2 Hz) has been described by Bruckenstein et al. A Fluke Model 1910A frequency counter was used in these experiments. The frequency-to-voltage converter and the potentiostat for the EQCM were custom-built in this laboratory. A dual-pen chart recorder (Linseis) was used to monitor both the EQCM cell response [in terms of frequency (mass) vs. time] as well as to simultaneously record the current-time or charge-time profiles.

Prior Conditioning of the Glassy Carbon and Au Electrode Surface

Preliminary experiments showed that in order to obtain reproducible data and to enable proper electrode surface regeneration for a new experiment, a "transition" layer of polypyrrole was necessary on the pretreated glassy carbon (voltametry) and Au (EQCM) surfaces. To this end, these electrodes were stepped from rest to +0.95 V in a solution containing 0.05M pyrrole and 0.1M KCl, and 143 mC/cm$^2$ was passed. This corresponds to the growth of a $\approx 0.3$ μm layer of polypyrrole [20]. Subsequent measurements (see below) were performed with such "pre-conditioned" electrode surfaces. Fresh electrode surfaces were regenerated for each new experiment by removing the polymer layer. This was done via vigorous $H_2$ bubbling generated by polarizing the electrodes at −1.50 V for a few minutes.

Calibration of the EQCM Apparatus

Figure 2:
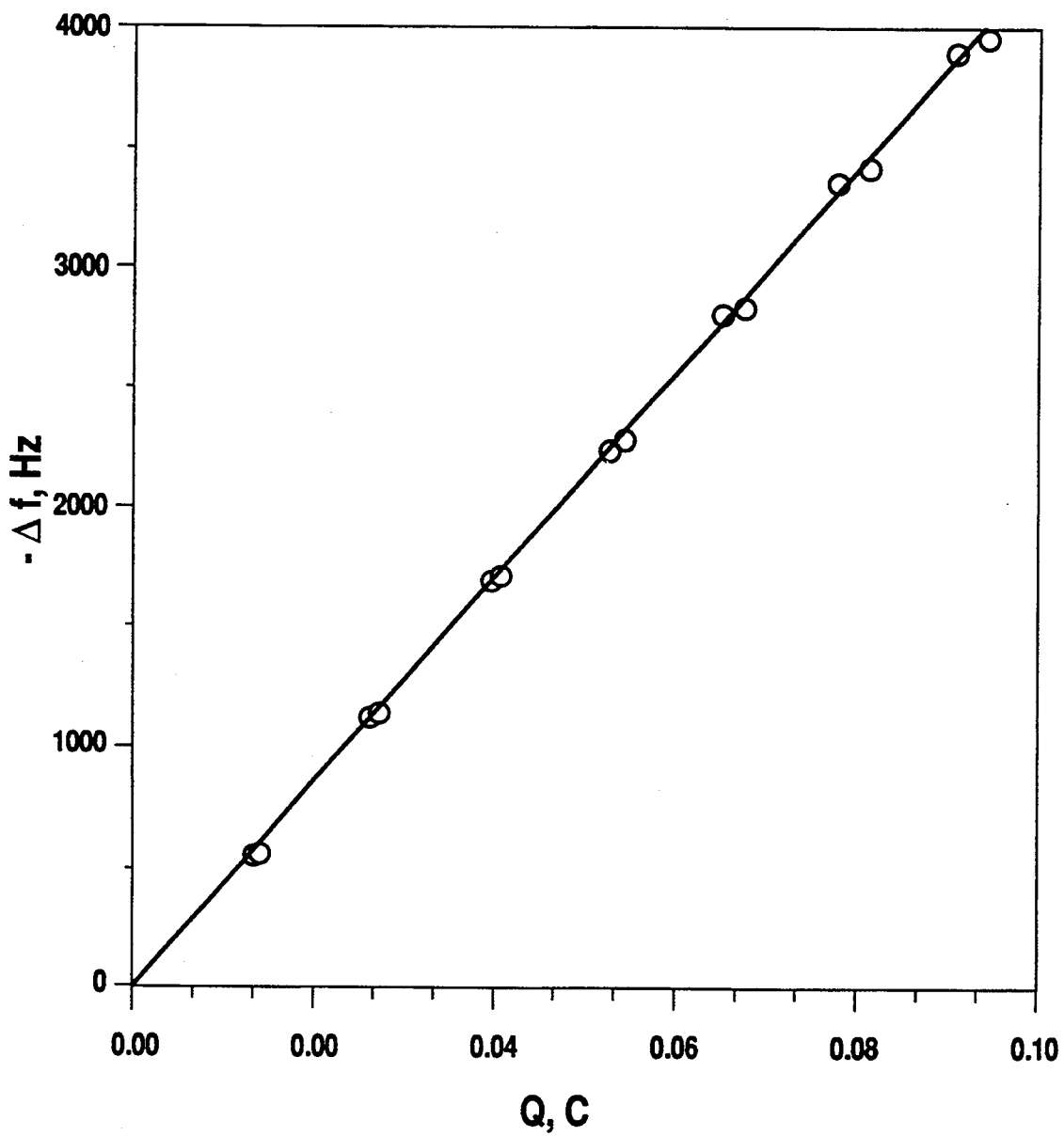
FIG. 2. Calibration of the electrochemical quartz crystal microgravimetry (EQCM) apparatus using a pre-condition Au surface (refer to text). The $Pt^0$ was electrodeposited from a 3 mM $K_2PtCl_6$ solution in 0.1M KCl at −0.30 V. The data are shown from duplicate experimental runs. The straight line was least-squares fitted through the data points.

The setup was calibrated by electrodepositing a Pt layer on the Au surface pre-conditioned as above. A solution of 3 mM $K_2PtCl_6$ in 0.1M KCl and a potential of −0.30 V were used for electrodeposition. FIG. 2 illustrates the frequency change (−Δf) versus the charge passed (Q) in one such experiment. The combination of the Sauerbrey equation (Sauerbrey) with Faraday's laws yields Eqn. 1, $$-\Delta f = \frac{kM}{nF} Q \quad (1)$$

In Eqn. 1, k is the Sauerbrey constant, M is the molecular weight of the species deposited, n is the number of electrons in the electrochemical discharge (4 in this case) and F is the Faraday constant (96487 C). The Sauerbrey constant $$\left( k = \frac{2f_o^2}{A\sqrt{\mu\rho}} f_o \right)$$

is the resonant frequency of the quartz, 5 MHz; μ is its shear modulus, $2.947 \times 10^{11}$ g cm$^{-1}$. From Faraday's law, 1 mC≡505.5 μg of platinum. This combined with the slope of the line in FIG. 2 (42,500 Hz/C) shows that a 1 Hz decrease corresponds to 17 ng/cm$^2$ in our setup. The difference between this value and the theoretical one is attributed in part to practical difficulties in the areal definition of the Au/polypyrrole surface; i.e., this surface may not be covered in toto by the electrodeposit. Nonetheless, we consider our apparatus to be well-behaved under the conditions approximating those in FIG. 2. Further, the close correspondence of the measured mass gain at the Au/polypyrrole surface with that expected from Faraday's law shows that Pt electrodeposits on the polypyrrole transition layer surface with $\approx 100\%$ coulombic efficiency.

Preparation of the $Pt^0$ Colloidal Suspension

To 10 mg of sodium citrate in 6.5 cc of water was added requisite amounts of $K_2PtCl_6$ to afford solutions varying in platinum content from 1 mM to 5 mM. This solution was placed in an ultrasonic bath for a few minutes. To the clear solution thus obtained, 2.5 cc of 0.2M pyrrole and 1 c of 1 M KCl were added to yield a 10 cc aliquot of the electrosynthesis medium. The resultant solution (pH: $\approx 6.5$) was stable and free of turbidity for $\approx 1$ hour. Only in the case of the 5 mM $K_2PtCl_6$ solution was a slow blackening of the medium observed after 30–40 minutes. Thus all handling of these solutions were completed within this timeframe.

Chandler et al. had observed similar darkening of the solution on mixing pyrrole and various metal ion solutions. Their observations, which were obtained on citrate-free media, were rationalized in terms of spontaneous homogeneous electron transfer from the pyrrole to the metal ions leading to oligomerization and polymerization. The fact that we do not observe this except at high platinum concentrations ($\geq \approx 5$ mM) suggests that the citrate acts as an effective reducing agent (Rheenen, et al.):

$$K_2PtCl_6 + \text{citrate} = Pt^0 + \text{oxidation products} \quad (2)$$

A similar function of the citrate ion has been noted by previous authors for colloidal Au solutions (Turkevich, et al.). The protective function of the citrate ion also cannot be discounted, and could be implicated in slowing down the charge transfer kinetics between pyrrole and the metal ions even at high concentrations. Certainly, these species have shown proclivity towards passivation behavior, as seen from "control" EQCM experiments on polypyrrole thin films grown in citrate-containing electrosynthesis media without Pt (see below).

Figure 5A:
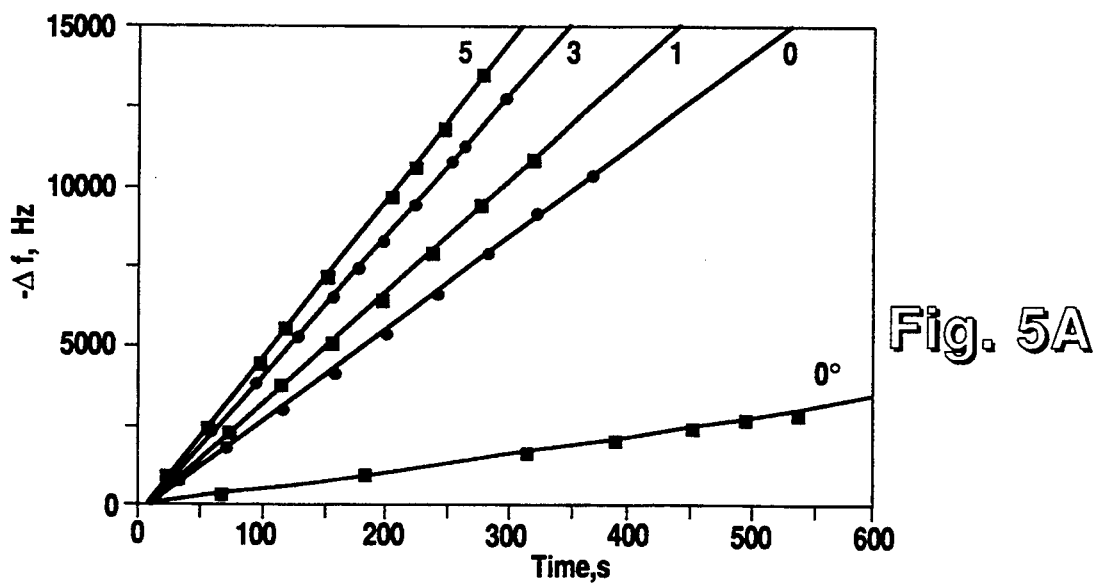
FIGS. 5A, 5B and 5C. Combined EQCM-coulometry data for the electrosynthesis of ppy and ppy/Pt thin films for a potential step from rest to +0.80 V.
Figure 5B:
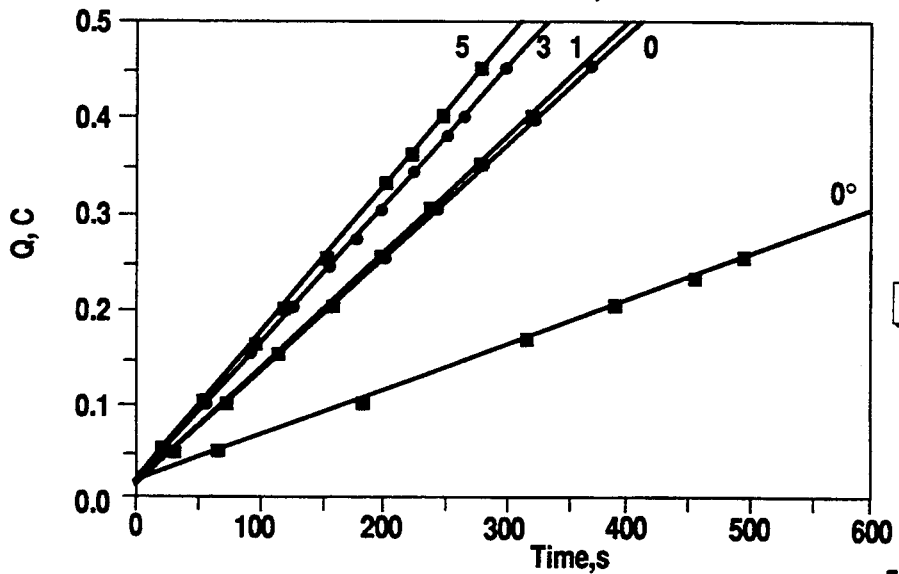
Figure 5C:
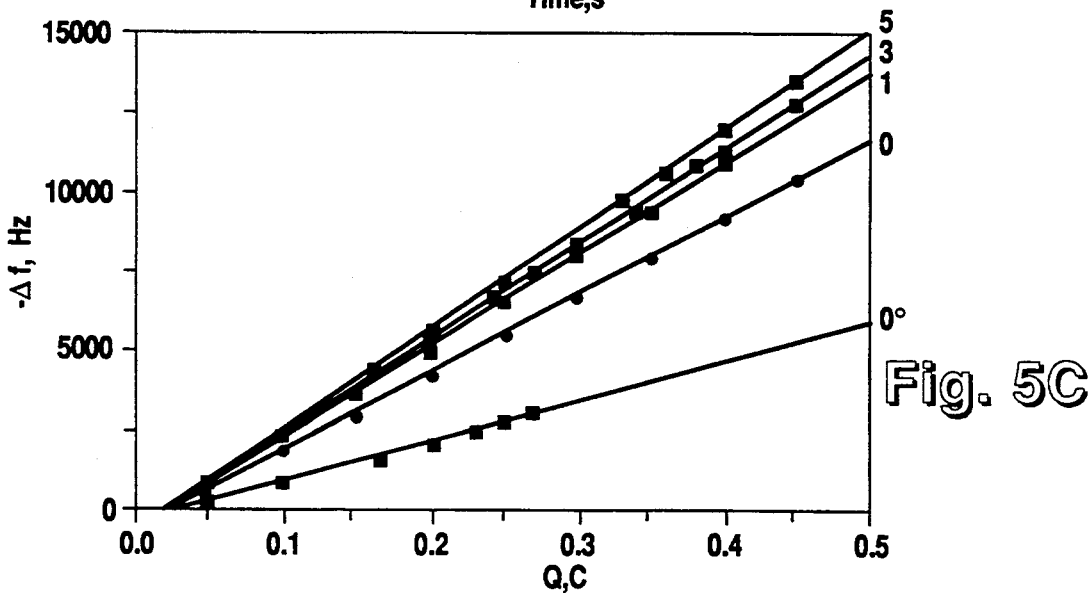

In previous formulations of metal colloidal solutions (e.g. Rheenen et al; Turkevich et al.) the practice has been to employ a large molar excess (10:1) of the citrate beyond that stoichiometrically required to reduce Pt(IV) to $Pt^0$. On the other hand, we have deliberately employed sub-stoichiometric levels of titrate because of its propensity to inhibit polypyrrole film growth (c.f. FIGS. 5A to 5C). Thus, our solutions contain both Pt(IV) and $Pt^0$ and only the (initial) total platinum content of the solution is quoted. However, evidence is described later herein that the (excess) Pt(IV) does not incorporate into our polypyrrole films via the direct electroreduction, i.e., Pt(IV)→$Pt^0$ route.

Polypyrrole Thin Film Growth

The pre-conditioned glassy carbon or Au electrodes were transferred to the electrosynthesis medium prepared as above. Control solutions containing citrate and no Pt and one containing no citrate were also investigate for comparison. In all the cases, these solutions were carefully deaerated with ultrapure $N_2$, and subsequent manipulations/synthesis experiments always utilized a $N_2$ blanket. In all the cases involving glassy carbon electrodes, the ppy or ppy/Pt thin films were generated by cycling the pre-conditioned electrode between +0.95 V and −0.80 V at 0.05 V/s. The anodic charge consumed in the (second)film growth charge was monitored and the electrosynthesis terminated when 714 mC/cm$^2$ had been passed in all the cases except where the film thickness was used as a variable (c.f. the next section below).

For Au electrodes either the same procedure or a step technique was used to generate the requisite (second) layer of ppy or ppy/Pt. In either case, the electrosynthesis again was terminated at 714 mC/cm$^2$. For the EQCM experiments, the frequency difference was nulled after the transition layer growth. Subsequently, the charge and frequency change were monitored at 50 mC increments.

Electrocatalysis Experiments

The electrocatalytic efficiency of the new ppy/Pt films was examined in 0.05M phosphoric acid medium for the reduction of proton and $O_2$ as model substrates. For these experiments, ppy/Pt films grown from the 3 mM platinum solution (see above) were used. The requisite (second) layer of ppy or ppy/Pt was generated on the pre-conditioned glassy carbon RDE electrodes by stepping the potential from rest to +0.75 V. Unlike in the types of experiments described earlier wherein the second layer polymerization charge was kept fixed at 714 mC/cm$^2$, we varied the thickness of the ppy/Pt films by adjusting the charge in the range from 500 mC/cm$^2$ to 5,500 mC/cm$^2$, to assess the corresponding changes in their catalytic efficacy. For comparison with the catalytic behavior of these new ppy/Pt electrodes, two types of reference samples were used: namely a Pt RDE electrode of comparable area (0.206 cm$^2$) and glassy carbon (0.206 cm$^2$) coated ppy films atop which Pt islands were electrodeposited in the traditional manner (ppy-Pt) (c.f. Holdcroft et al.). For the latter, ppy films were electrosynthesized as described above from 0.05M py+0.1M KCl. To preclude the interference from the polymer redox charge in the coulombic assay of the Pt coverage, the (oxidized) ppy films were subsequently reduced in 0.1M KCl at $\approx$0.5 V till the currents decayed to background level. (This took $\approx$5 min to $\approx$10 min depending on the film thickness). The reduced films were rapidly transferred to $N_2$-saturated 3 mM $K_2PtCl_6$+0.1M KCl solution and Pt was electrochemically deposited by stepping the potential to −0.3 V, and passing the requisite number of coulombs. Such films are denoted below as "ppy-Pt".

Sample Preparation for XPS, TEM and SEM

Air-dried and ppy/Pt specimens were examined by XPS on glassy carbon supports. For TEM studies, the polymer films were grown (under conditions similar to those specified above) on a Au minigrid (Buckbee-Mears/Interconics, 100 wires/in). The polymer was in the oxidized form in both XPS and TEM experiments. For SEM experiments, the glassy carbon-supported films were reduced at −1.2 V to enable them to be readily peeled off from the support (presumably because of vigorous $H_2$ evolution), and mounted on carbon studs after air-drying.

Results and Discussion

Electrosynthesis of PPy and PPy/Pt Thin Films

FIG. 3 contains parallel cyclic voltametry-EQCM data at a Au electrode pre-conditioned with a transition ppy layer as described in the preceding section and repetitively cycled in the ppy electrosynthesis medium. The frequency change corresponding to the ppy and ppy/Pt thin film growth on repetitive cycling is shown superimposed on the current-potential scans. The gradual evolution of ppy overlayer with (FIG. 3b) and without Pt colloidal particles (FIG. 3a) embedded in it, is seen in these data. The ppy/Pt film was grown in a solution containing 3 mM platinum. The voltametric behavior in the absence of Pt is similar to that recorded by previous authors (Kuwabata et al.) and therefore warrants little new discussion. We merely emphasize the absence of significant redox activity at potentials negative of $\approx$0 V in this case. When Pt is present in the ppy electrosynthesis medium, the new features in the voltammograms are two cathodic waves at 0.10–0.20 V and $\approx$−0.40 V respectively. Interestingly enough, the frequency change is not significant in the potential regimes corresponding to the new cathodic features associated with the presence of $Pt^0$, signalling that these redox processes are not associated with appreciable mass uptake or loss (but see below). On the other hand, as expected, the anodic current flow at potentials positive of $\approx$0.60 V in both cases is accompanied by a significant negative $\Delta f$ excursion concomitant with polymer growth/Pt uptake and associated mass gain at the electrode surface. It must be noted that any mass gain/loss associated with the transport of ionic species and solvent molecules during the redox electrochemistry of ppy itself, will only manifest to a negligible extent (a few Hz as opposed to kilohertz) on the frequency scale shown in FIGS. 3A–3B.

We assign the −0.40 V cathodic feature to $O_2$ reduction with an influence from proton reduction at more negative potentials (see below). Though attempts were made to rigorously exclude $O_2$ from the electrolyte in these experiments, we cannot rule out the adventitious reduction of $O_2$ which is generated at the auxiliary electrode and which gets trapped within the growing ppy matrix. The assignment of the 0.10–0.20 V cathodic wave for the ppy/Pt films (FIG. 3b) is more difficult. A possibility is that it arose from the reduction of Pt (surface) oxides generated on the forward (positive-going) sweep. Certainly, the mass change associated with such a process would be minimal on the scale of FIG. 3b as is indeed observed.

Figure 4:
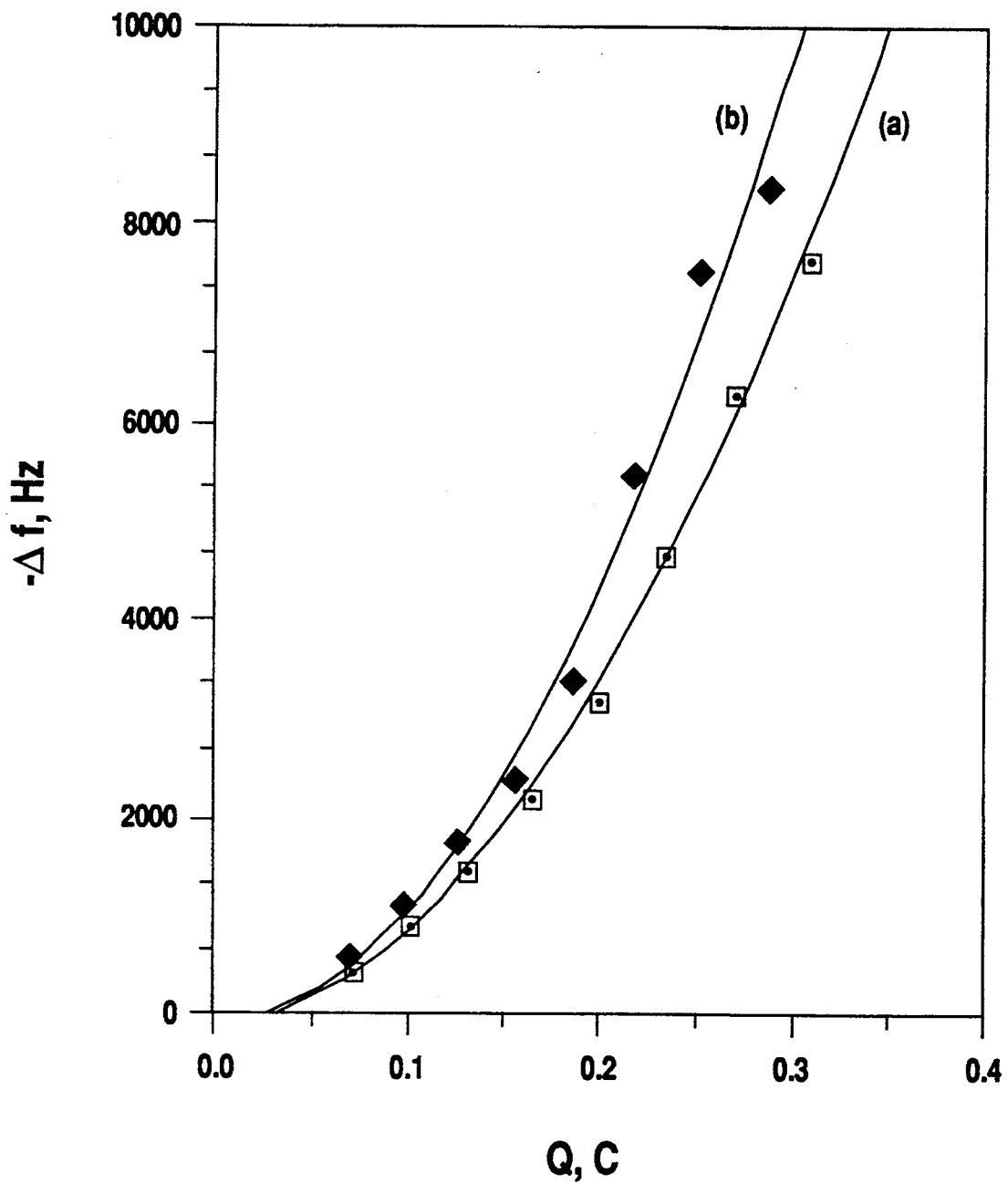
FIG. 4. Plots of the frequency change ($-\Delta f$) vs. anodic charge (Q) from the data in FIG. 2. Panels a and b correspond in the two figures. Note the abscissa intercept in FIG. 4 which arises from the charge consumed during growth of the py transition layer (refer to text). The lines were simply drawn through the data points.

FIG. 4 illustrates the correlation of the frequency change, −$\Delta f$, from the EQCM experiments with the coulometry data fro the ppy films with and without Pt. Note that the curve "b" for ppy/Pt lies above that ":a") for the ppy sample. The two plots would have been coalesced if the mass change at the electrode surface were comparable in the 0 mM platinum and 3 mM platinum cases. Evidence is shown later herein for the fact that addition of the Pt precursor to the electrosynthesis medium has no noticeable influence on the py polymerization rate). We further note that the polymerization rate is not constant throughout the deposition sequence. This is seen both by the faster rate of frequency change in the latter stages (FIGS. 3A–3B) as well as by the curvature in the −$\Delta f$ vs. Q plots (FIG. 4).

Quantitative Analysis of the EQCM Data on ppy and ppy/Pt Thin Films

An important point that emerges from the data in FIGS. 3A–3B is that the py polymerization and platinum uptake by the polymer film are localized within the same potential regime (i.e., at potentials positive of $\approx$0.6 V). In other words, the direct electroreduction of Pt(IV) to $Pt^0$ does not appear to be important under our conditions. More precise delineation of the potential range wherein $Pt^0$ is "electrotrapped" within the growing ppy matrix is facilitated by potential-step experiments. Further, quantitative analysis of voltametric cycling data such as those in FIGS. 3A and 3B and 4 is confounded by precise delineation of the polymerization charge, interference from thin film reduction processes during the negative-going portion of the cycles, and the loss of soluble oligomers with concomitant reduction in polymerization efficiency during the cycling. All of these difficulties are also best circumvented via the use of a potential-step thin film growth mode.

FIGS. 5A–5C contains representative data shown in terms of $-\Delta f$ vs. time (FIG. 5a), Q vs. time (FIG. 5b) and $-\Delta f$ vs. Q (FIG. 5c) plots for a potential step from rest to $+0.80$ V. The platinum concentration in the electrosynthesis medium is shown as a parameter. Also shown for comparison is a control experiment wherein citrate was present but without platinum in the medium. The inhibiting influence of citrate on film growth is clearly seen in all the three types of plots in FIGS. 5A–5C (i.e., the slope of the plots or the rate of mass gain is smaller when citrate is present). The citrate presumably blocks the active sites at the electrode surfaces (via adsorption?) thus inhibiting polymer growth. On the other hand, this "poisoning" of the electrode surface does not occur when the citrate is oxidized by the Pt(IV) in the solution via Reaction 2.

The difference in slopes of the $-\Delta f$ vs. Q plots for ppy thin films and those grown in the presence of varying quantities of platinum in the electrosynthesis medium (FIG. 5c), provides a route to the quantitation of platinum uptake by the polymer thin films. However, one could well argue that the slope differences may be due to significant differences in the polymerization rate in the two instances, i.e. the presence of platinum in the electrosynthesis medium may have a positive influence on the growth of ppy. To address this possibility, the area encompassed in the cyclic voltametry scans (not shown) for ppy and ppy/Pt films cycled in 0.1M KCl were analyzed. If more polymer were formed in the presence of platinum, the redox charge encompassed should increase with a corresponding increase in the platinum loading of the electrosynthesis medium. The redox charge showed no such trend. (Since the cathodic $O_2$ and proton reduction wave (c.f. FIG. 3b) increased in magnitude with $Pt^0$ loading, only the polymer redox regime between 0 V and $+0.50$ V was used for the integration.) Thus we can safely conclude that the differing slopes of the plots in FIG. 5c are a manifestation solely of the $Pt^0$ uptake by the ppy thin film. Suitable subtraction of the baseline slope corresponding to ppy itself yields the $Pt^0$ loading as shown in Table I.

TABLE I

| Platinum concn. in the ppy electrosynthesis medium mM | EQCM Analyses | |
|---|---|---|
| | Slope of $-\Delta f$ vs. Q plots[a] Hz/C | $Pt^0$ content wt.%[b] |
| 0 | 24,750 | 0 |
| 1 | 28,500 | 13.1 |
| 3 | 30,000 | 17.5 |
| 5 | 31,500 | 21.4 |

[a]Data from FIG. 5c.
[b]The quoted Pt content has an estimated error of ±1%.

Thus an increase in the platinum loading of the electrosynthesis medium is accompanied by a concomitant increase in the Pt content of the ppy thin film.

An important issue not yet addressed is the delineation of the potential regime wherein the $Pt^0$ colloidal particles are "electrotrapped" by the growing ppy matrix. To this end, plots such as those in FIG. 5c were acquired from EQCM/coulometry data as a function of the polymerization potential. These experiments were done for ppy and the sample generated from a median 3 mM platinum concentration in solution; corresponding data are shown in FIG. 6a and 6b respectively.

Consider FIG. 6a. Separate elemental analysis on our ppy thin films establish the Cl$^-$ dopant to be distributed on a 1 Cl$^-$/3 py ring basis. This in turn leads to an n value of 2.3 for the electrosynthesis which is in good agreement with results from similar ppy thin films in other laboratories (Kuwabata et al., Diaz et al. (1980), Diaz et al. (1981); Feldman et al.) Exceptionally high doping levels have been reported in some instances (Asavapiriyanont et al.; York et al. (1990). The factors leading to such high doping levels are not all clear at present. Nonetheless, the molar mass of 75.6 g mol$^{-1}$ for our material and Faraday's law lead to a predicted mass for ppy of 340.8 μg for each C of anodic charge passed. Polymerization efficiencies thus estimated from FIG. 6a are presented in Table II as a function of potential.

TABLE II

| | Sample | | | |
|---|---|---|---|---|
| | PPy | | PPy/Pt[b] | |
| Growth Potential mV | Slope of $-\Delta f$ vs. Q plot[c] | Polymerization Efficiency %[d,e] | Slope of $-\Delta f$ vs. Q plot[f] | $Pt^0$ content wt.%[e] |
| 750 | 20,180 | 74.2 | 28,928 | 30.0 |
| 775 | 23,800 | 88.1 | 29,643 | 19.7 |
| 800 | 24,750 | 91.6 | 30,000 | 17.5 |
| 950 | 27,100 | 100.4 | 32,250 | 16.0 |
| 975 | 28,100 | 104.1[g] | 31,071 | 9.5 |

[a]Expressed as the final potential to which the electrode is stepped to, from rest.
[b]Sample grown from a 3 mM platinum solution.
[c]From FIG. 6a.
[d]Assumes n = 2.3 and that this value is not significantly affected by potential (refer to text).
[e]The quoted values have an estimated error of ±1%/
[f]From FIG. 6b.
[g]Estimate likely to contain error due to "overoxidation" (i.e., degradation) of the polymer.

These estimates also hinge on the reasonable assumption that the doping level remains sensibly constant over the potential range considered in FIGS. 6A and 6B. Thus, the py polymerization clearly is not very efficient at potentials below $\approx +0.80$ V, at least in the medium investigated. We are not aware of similar measurements using EQCM on ppy. However, polymerization efficiencies have been monitored via time-resolved in situ UV-visible transmission spectroscopy for terthiophene (Eales et al.) and using EQCM, for vinyl ferrocene (Hillman et al.)

Using FIG. 6B, calculations as above lead to quantitation of the $Pt^0$ uptake by the polymer as a function of the polymerization potential; these estimates are contained in Table II. Interestingly enough, the $Pt^0$ uptake increases as the polymerization potential decreases; that is, the slower the rate of polymer growth, the greater the amount of $Pt^0$ trapped within the polymer matrix. This trend furnishes further support for our "electrotrapping" model. The negative surface charge typical of metallic colloids such as $Pt^0$ may provide an electrostatic driving force component for the electrotrapping phenomenon. It is also important to note the essentially similar frequency-potential profiles observed in the absence and presence of platinum in FIGS. 3A and 3B. Thus the available evidence collectively supports our assertion (see above) that the uptake of Pt by the ppy thin film presumable takes place by the above trapping mechanism as opposed to a Pt(IV)→Pt$^0$ electrodeposition route as in previous studies. Our results from XPS experiments furnish further compelling evidence for this.

Electrocatalysis Studies

In comparing the electrocatalytic activity of our new ppy/Pt films with the conventionally prepared ppy-Pt samples (i.e., those containing electroreduced Pt$^0$ at the ppy surface), it was important to keep the Pt loading constant. This was done at 30 wt. % (c.f. Table II) by controlling the Pt$^0$ electrodeposition charge for the reference ppy-Pt specimens as described in the Experimental section. Thus the thinnest ppy sample ("1") in FIG. 7a comprises 0.1 C of ppy and 0.007 C of Pt$^0$. Similarly the thickest films ("4") consumed 1.1 C for ppy and 0.071 C for Pt$^0$.

The polarization curves for the hydrogen evolution reaction (HER) are compared in FIGS. 7A and 7B for ppy-Pt (conventional) and ppy/Pt$^0$ (3-D) electrocatalysts. In both cases, the film thickness is shown as a parameter. Two features in FIGS. 7A and 7B are worthy of note: (a) The ppy/Pt samples are much more catalytically potent relative to their ppy-Pt counterparts. Note that the currents in FIGS. 7A and 7B differ approximately by an order of magnitude. (b) In the case of ppy-Pt samples, the HER rate increases with the film thickness up to $\approx 0.3$ C, and then saturates at that level. Presumably a maximal Pt$^0$ surface coverage is achieved at 0.3 C. (Similar behavior was reported by previous authors (Tourilion et al.(b)) for the same reaction at Pt$^0$-loaded polyvinyl acetic acid) and poly(methyl thiophene) respectively.) By way of contrast, the three-dimensional ppy/Pt films show a monotonic increase of catalytic activity with film thickness, again by an order of magnitude, and with no evidence for saturation behavior.

In both the cases, the currents decay at more negative potentials as the ppy electronic conductivity is degraded (Feldman et al.). An important advantage with the three-dimensional distribution of Pt$^0$ particles within the ppy matrix thus accrues from the efficient shuttling of charge from the underlying support electrode to the reaction sites (Liu et al.). Note that while the total quantity of the Pt$^0$ catalyst is comparable in the two cases, it is their distribution which accounts for the difference. Preliminary experiments using AC impedance spectroscopy show enhanced conductance for our ppy/Pt samples relative to ppy.

The currents at potentials positive of the standard potential for HER ($-0.33$ V in 0.05M $H_3PO_4$) in FIGS. 7A and 7B, may be attributed to adsorbed hydrogen formation at the Pt surface (i.e., "Pt-hydride" region) The much-enhanced current flow in this region at ppy/Pt (FIG. 7B) relative to ppy-Pt (FIG. 7A) would be consistent with the higher degree of surface dispersion of Pt in the former case; i.e. at the three-dimensional ppy/Pt electrode, the dispersed colloidal Pt$^0$ particles present a larger surface for the adsorption of hydrogen atoms.

FIGS. 8A and 8B illustrates corresponding rate data from the $O_2$ reduction reaction. In this instance, the deleterious influence of increasing film thickness for the ppy-Pt samples is even more drastic relative to the her case. However, thinner samples of ppy-Pt do outperform the ppy/Pt specimens in this case. This could simply be a manifestation of the higher surface concentration of $Pt_2$ in the ppy-Pt case relative to the ppy/Pt samples. However, the three-dimensional distribution of Pt$^0$ starts to exert a favorable role for the thicker ppy/Pt electrodes. On the other hand, note that in FIG. 8A, the thicker samples show a decrease in catalytic activity with increasing film thickness. A similar trend was noted by previous authors (Holdcroft et al.). A more detailed account of the electrocatalytic behavior of the ppy/Pt samples including a mechanistic model will be presented in subsequent examples.

Further comparisons between ppy/Pt and ppy-Pt are contained in FIGS. 9A and 9B which also includes information on the catalytic activity of a massive Pt electrode towards HER (FIG. 9A) and $O_2$ reduction (FIG. 9B) respectively. Table III provides quantitative comparisons of the catalytic activity [in terms of reaction rate (current) at $-400$ mV vs. SCE] towards these substrates for the four types of samples, viz. ppy, Pt, ppy/Pt and ppy-Pt.

TABLE III

| Sample$^a$ | HER$^{b,c}$/ $\mu A\ Cm^2$ | $O_2$ reduction$^{c,d}$/ $\mu A\ Cm^2$ |
|---|---|---|
| Pt | 730 | 2,193 |
| ppy (1.1) | 105 | 1,295 |
| ppy (1.1)-Pt (0.071) | 140 | 2,242 |
| ppy/Pt (1.1) | 1,025 | 3,510 |

$^a$The quantities in parentheses denote the coulombs consumed.
$^b$Data from FIG. 10a.
$^c$The quoted values have an estimated error of $\pm 10\%$.
$^d$Data from FIG. 10b.

Data such as these show comparable catalytic activity for the HER at ppy/Pt vis-à-vis the massive Pt electrode and a $\approx 7\times$ enhancement of reaction rate in the former case relative to ppy/Pt. Correspondingly, for the $O_2$ reduction reaction, comparable catalytic activity is seen for the massive Pt and ppy-Pt cases at a potential of $-400$ mV (vs. SCE) whereas the ppy/Pt sample shows a more modest (ca. $1.6\times$) enhancement (FIG. 9b). In both the cases, the massive Pt outperforms ppy-Pt and ppy/Pt at more negative potentials ($> -500$ mV vs. SCE) when the polypyrrole matrix effect sets in. However, the degradation in performance due to this latter effect is much more severe for the ppy-Pt case than for ppy/Pt (FIGS. 9A and 9B). We attribute this difference to the favorable influence on the ppy electronic conductivity when Pt particles are dispersed within its bulk, as in ppy/Pt.

A comparison of the HER and $O_2$ reduction data reveals two trends: (a) The $O_2$ reduction currents are much higher in magnitude relative to those for the HER, and (b) The decay in current flow at potentions negative of $\approx -500$ mV is much less pronounced in the $O_2$ reduction case relative to her. It is also worthy of note in the data in FIGS. 9A and 9B, that ppy itself exhibits a non-negligible catalytic activity towards $O_2$ reduction (for example, compare curve i in FIGS. 9A and 9B). On the other hand, the catalytic activity of ppy is minimal towards $H_2$ oxidation. Obviously the conductivity of the ppy matrix appears to be a less important factor when the reaction already is proceeding at a reasonably fast clip—the $O_2$ reduction system being a case in point. The molecular origins of this interesting trend would require further (possibly spectroscopic) work. Recent UV-visible spectroelectrochemical experiments do reveal chemical interactions between polypyrrole and molecular $O_2$ (see other Examples, e.g.)

The unusual catalytic activity of polymer-supported Pt$^0$ catalysts (relative to bulk Pt$^0$) has been attributed (Gholamian et al., Shimazu et al.) to catalyst-support electronic interactions, although at least in the present instance, the enhancement that we see is more likely a manifestation of the fine (nm size range, see FIG. 11) dispersion of the Pt catalyst particles in the ppy/Pt samples. Thus not only is a large fraction of the catalyst surface exposed to the substrate (a situation approaching the homogeneous catalysis case), but also the reaction overpotentials are minimized by the high surface area in the ppy/Pt case.

XPS, EDX and Electron Microscopy of PPy/Pt Films

Semi-quantitative analyses of ppy and ppy/Pt films were also attempted via XPS. The atomic concentrations of the elements were recalculated on the basis of nitrogen assuming a ratio of 1:4 for N:C in ppy. The results are compiled in Table IV.

TABLE IV

| Element | PPy Sample[c] | | | |
|---|---|---|---|---|
| | 0 | 1 | 3 | 5 |
| C | 75.8 | 74.6 | 74.3 | 72.5 |
| | (66.8) | (55.7) | (53.9) | (48.1) |
| N | 19.0 | 18.5 | 18.6 | 18.3 |
| | (19.5) | (16.3) | (15.7) | (14.2) |
| Cl | 5.3 | 6.3 | 5.5 | 7.1 |
| | (13.7) | (14.1) | (11.8) | (13.9) |
| Pt | 0 | 1.1 | 1.6 | 2.2 |
| | (0) | (13.9) | (18.6) | (23.9) |

[a]Expressed on N basis; the values shown are atom %, those in parentheses refer to wt %.
[b]Data acquired at 45° take-off angle.
[c]The sample notation refers to the platinum concn. (mM) used in the electrosynthesis medium for ppy (refer to text).

As with the EQCM estimates in Table I, the $Pt^0$ loading in the ppy films scales with the platinum level in the electrosynthesis medium. While the EQCM estimates and the XPS results are in general accord, it must be noted that the films were not grown under strictly comparable conditions in the two cases. For EQCM, the films were electrosynthesized at constant potential (+0.80 V in Table I), whereas the ppy/Pt samples for the XPS analyses were prepared by potentiostatic cycling between +0.95 V and −0.80 V.

The high-resolution XPS scan in FIG. 10 shows the Pt $4f_{5/2}$ and $4f_{7/2}$ core electrons to appear at 74.7 eV and 71.4 eV respectively. These are in good agreement with the corresponding values (74.3 eV and 70.9 eV) reported for $Pt^0$ in our ppy/Pt electrocatalysts originated from the colloidal "precursor" in solution. It should be noted that for the XPS experiment in FIG. 10, the ppy/Pt samples were grown at constant potential (+0.85 V) unlike those considered for the XPS analyses in Table IV, and at no time were they subjected to potentials negative of this value. A depth profile of a ppy/Pt film grown from a 3 mM platinum solution revealed the Pt content to be uniform down to a depth of $\approx 0.2$ μm. This trend is consistent with the EQCM results in that the straight line segments in $-\Delta f$ vs. Q plots imply a uniform rate of $Pt^0$ uptake. The conclusion is inescapable that we have a ppy matrix within which a three-dimensional array of $Pt^0$ colloidal particles is uniformly embedded (FIGS. 1A and 1B). Further confirmation of the morphology is provided by the electron microscopy data.

Scanning electron micrographs of our ppy/Pt films revealed a highly microporous structure with polymer fibrils spanning the μm diameter range. However, unlike in the previously reported cases (Gholamian et al.; York et al.; Holdcroft et al.) NO $Pt^0$ could be pinpointed even at 6500× magnification, suggesting that the $Pt^0$ particle size was in the sub-μm range. Further, the EDX probe analyses were done at magnifications ranging from 500× to 6500× thus varying the sampling area. The peak amplitude for $Pt^0$ did not significantly change; the presence of μm size $Pt^0$ particles could have modulated the EDX signal as the probe was scanned across "bright" and "dark" regions of the SEM picture. The representative TEM photograph shown in FIG. 11 for a ppy/Pt sample demonstrates that the $Pt^0$ particles in our samples are truly colloidal and in the catalytically useful size regime. These particles manifest as the small dark spots (avg. dia.: $\leq 10$ nm) in FIG. 11. Evidence that the larger dark patches in FIG. 11 are not $Pt^0$ is again furnished by EDX.

EXAMPLE 2

The Reduction of Dioxygen and the Oxidation of Hydrogen at Polypyrrole Film Electrodes Containing Nanodispersed Platinum Particles Electrocatalytic modification of electrode surfaces is now a mature field although examples of functionalized conducting polymers such as polypyrrole have only recently begun to proliferate (Deronzier et al.; Curran et al.) Example 1 describes the electrosynthesis and catalytic activity of polypyrrole films containing a three-dimensional array of nanometer-sized platinum catalyst particles. In particular, we showed that the catalytic activity of these materials towards the hydrogen evolution and dioxygen reduction reactions increased with increasing film thickness, and did not show rate saturation —a behavior characteristic of surface-confined catalyst situations. We develop these issues further in this example with particular emphasis on the kinetics of the reduction of dioxygen, and the oxidation of hydrogen respectively. These conjugate reactions, clearly of importance to fuel cells, are abbreviated in what follows as "ORR" and "HOR" respectively.

There have been previous studies of the ORR at polypyrrole with or without platinum incorporated in it. Jakobs et al., using the RRDE technique, concluded that polypyrrole is permeable to $O_2$, and the ORR mainly occurs at the support metal (pt)/polypyrrole interface. On the other hand, Holdcroft et al. attribute non-linear Levich behavior to $O_2$ permeation limitations at platinum-modified polypyrrole electrodes. A more recent study by York et al. (1990) reports a difference in catalytic behavior between a surface-confined platinum-polypyrrole electrode and one in which the catalyst particles are more homogenously distributed throughout the film bulk. A lower conversion rate for the ORR was observed by these authors for the latter electrode configuration.

There also is disagreement on the issue of the catalytic activity of polypyrrole itself (i.e. with no catalyst) towards the ORR. While some authors (e.g. Okabayahi et al.) report little activity, both Jakobs et al. and the present inventors have observed a non-negligible level of activity in the parent polymer. Some of the variability in the data undoubtedly is materials-related. Other complications from the support electrode material must also be considered. Therefore, particular attention was paid in this study to decouple the influence of the (underlying) support metal on the ORR by using an inert material such as glassy carbon (instead of platinum as in a previous study, (Jakobs et al.). Under these conditions, we show that the rate limitation for the ORR in our new ppy/Pt nanocomposite electrodes resides with the bimolecular reaction dynamics between the catalyst and the substrate. At negative potentials ($<\approx -0.20$ V vs. Ag/AgCl), the degradation in the electronic conductivity of the polypyrrole matrix itself starts to exert a further rate limitation on charge transport, although the platinum particles ameliorate the situation somewhat in this regard. In what follows, we will examine our hydrodynamic (RDE) data on the ORR in 0.05M $H_3PO_4$, in the light of available models for the analysis of polymer-modified electrode systems.

Interestingly enough and contrasting with the ORR case, polypyrrole exhibits little catalytic activity towards the HOR. This trend, noted by previous authors (York et al.) was confirmed in this study. York et al. in their study of the HOR, used either electrodeposition of platinum on a pre-formed polypyrrole layer or samples wherein 4 to 44 $\mu$m platinum particles apparently were entrapped in polypyrrole films which were 10-100 times smaller in thickness. Preliminary experiments on the HOR have also been presented by Lyons et al. using platinum-modified polypyrrole samples similar to those of York et al.

Experimental

Procedural details on the electrosynthesis of polypyrrole (ppy) and platinum-modified samples are given in Example 1. A glassy carbon RDE (geometric are: 0.206 $cm^2$) from Pine Instrument Co. was used as a support for these samples. Prior to polymer deposition, its surface was polished to a mirror finish with $Al_2O_3$ slurry down to 0.05 $\mu$m on a microcloth (Buehler) followed by sonification for a few minutes in distilled water. The polypyrrole films were potentiostatically synthesized from 0.05M pyrrole +0.1M KCl at +0.75 V (vs. Ag/AgCl/3M KCl reference). The thickness was controlled via the charge consumed in the polymerization. The platinum-modified samples (hereafter denoted by "ppy/Pt") were synthesized from a similar solution as above containing the requisite amount of platinum (as $K_2PtCl_6$) and sodium citrate to generate the colloidal platinum precursor. Such samples are designated in what follows by the notation: ppy/Pt/x, where x mM refers to the platinum content of the electrosynthesis medium. We have previously established, both via quartz crystal microgravimetry and X-ray photoelectron spectroscopy, that the platinum content of the ppy/Pt samples does scale with the initial loading of the electrosynthesis medium up to at least 5 mM.

The electrochemical instrumentation for film growth is described in Example 1. Hydrodynamic (RDE) measurements were performed on a Pine Instrument Co. Model 4 bipotentiostat and a Model MSRX electrode rotor. Measurements were done in a sealed customer-built three-limb cell. A SCE was used as the reference in these experiments and all potentials hereafter are quoted with respect to this reference: a platinum foil served as the counterelectrode.

The results of previous investigators (York et al.), as well as our exploratory cyclic voltametry experiments, established the importance of minimizing the extent of polypyrrole degradation under an $O_2$ atmosphere especially in the platinum-free condition. This necessitated special care in designing the steady-state RDE voltametry experiment in order to obtain reproducible results which were free from the artifacts due to materials degradation. An additional criterion was to be able to make in situ correction for the background current flow; i.e. currents not directly attributable to the ORR.

Thus, the data acquisition procedure that we utilized was as follows.

After growing the ppy or ppy/Pt films to the requisite thickness under ultra-pure $N_2$ atmosphere, the electrodes were thoroughly washed with distilled water and transferred to $N_2$-saturated 0.05M $H_3PO_4$. These electrodes were then pre-polarized at $-0.30$ V prior to recording the background currents. The electrode potential was shifted to $-0.05$ V and the rotation adjusted to 10 rpm, and the current value noted after the readings were stable (this typically took $\approx 1$ min). The speed was changed to the next level and the current was similarly recorded. At least ten different speeds (nominally spanning the range, 10-1000 rpm) were utilized at each potential. At the end of each rotation sequence, the potential was changed to the next value to repeat the steady-state current measurement procedure. The potentials were sequentially incremented in this manner up to $-0.80$ V.

The electrode was then held at $-0.30$ V, the $N_2$ bubbling terminated, and the electrolyte sparged with vigorous $O_2$ flow. Saturation of the electrolyte with $O_2$ was signalled by the ORR current attaining a steady level (usually $\approx 30$ min. elapsed for this condition to be reached). The same procedure was repeated for each electrode as described above to acquire the ORR data. The above procedure obviously differs from the usual methods of acquiring hydrodynamic voltametry data under slow potential scan conditions (Bard et al.)

Thus the data presented below for the ORR in FIG. 12B are background-corrected. On the other hand, the negligible catalytic activity of polypyrrole towards the HOR facilitated a more straightforward correction procedure for the background (i.e. redox) current flow, which is detailed along with the data later. A $H_2$-saturated 0.5M $H_2SO_4$ electrolyte was utilized for the HOR experiments. The HOR currents at polarization potentials ranging from $-0.30$ V to $+0.30$ V were recorded at electrode rotation speeds in the 60 RPM to 3840 range. The samples were similar to those utilized earlier for the ORR portion of the study except that only two variable platinum loadings, namely, ppy/Pt/2 and ppy/Pt/3, were included.

Results and Discussion

Hydrodynamic Data on ppy and ppy/Pt for the ORR

FIG. 12 contains a comparison of polarization curves (electrode rotation speed: 90 rpm) for the ORR for the glassy carbon support electrode, and those containing an overlayer of polypyrrole, ppy/Pt/1, ppy/Pt/2 and ppy/Pt/3 respectively. The thickness of the overlayer was maintained constant for this comparison by controlling the synthesis charge at 0.3 C. This corresponds to a film thickness of 3.6 $\mu$m assuming that 1 $C/cm^2$ yields 2.5 $\mu$m of ppy or ppy/Pt [11]. The data in FIG. 12 underline the suitability of glassy carbon as an "inert" support for the ORR especially at potentials below $\approx -0.40$ V. Additionally, these data reconfirm our earlier finding as well as others (Jakobs et al.) for the non-negligible catalytic activity of polypyrrole towards the ORR. Further, although the curves labelled "2-5" show a rough tendency to level off at potentials below $\approx -0.30$ V, the classical S-shaped behavior shown by metal surfaces (Bard et al.) is not observed for ppy or ppy/Pt. Finally, the ORR currents at all potentials scale with the platinum content of the ppy/Pt samples although the rate enhancement is marginal at platinum solution loadings beyond 3 mM. For reference, the platinum content of the ppy/Pt/3 film in FIG. 12 is $\approx 30$ wt %.

The ORR data for a somewhat thinner polypyrrole film (than that considered in FIG. 12) are shown in FIG. 12A as a function of the electrode rotation speed. The "peaking" behavior is more clearly evident here. The behavior of the ppy/Pt samples at other rotation speeds qualitatively was similar explanation, of course, at progressively higher current levels (c.f. FIG. 12). FIG. 12B contains the representative variation of the ORR current with the ppy/Pt synthesis charge (or equivalently, the film thickness) for ppy/Pt/1 respectively. The electrode rotation speed is shown as a parameter in this plot. Similar trends as in FIG. 12B were also noted for the ppy, ppy/Pt/2 and ppy/Pt/3 samples, and are therefore not shown for the sake of brevity. The currents in the plots in FIG. 12B correspond to a potential of $-0.30$ V, i.e. at the peak in FIG. 12A for example. We attribute the decay in the current flow at more negative potentials to a manifestation of the degradation of the electronic conductivity of the polypyrrole matrix (Feldman et al. and York et al.). On the other hand, the slight increase in the currents at potentials lower than $\approx -0.70$ V probably reflects the contribution from the glassy carbon support (c.f. FIG. 12).

Data Analyses

Prior to analyzing the data, a brief synopsis of available models is appropriate. The simplest situation involves the Levich flux to the electrode surface (York et al. (1986).:

$$i_L = 0.62 n\, F\, A\, D_s^{2/3} \omega^{1/2} \nu^{-1/6} C^* \qquad (1)$$

In Eqn. 1, n, F, A have their usual electrochemical significance, $D_s$ is the diffusion coefficient of the substrate ($O_2$ and $H_2$ in our case) in the solution, $C^*$ is its bulk concentration, $\omega$ is the angular rotation speed (rad. $s^{-1}$) and $\nu$ is the kinematic viscosity of the fluid. Electron transfer kinetics limitations manifest as a curvature in the Levich plots of $i_L$ vs. $\omega^{1/2}$ or alternately as a finite intercept in the Koutecky-Levich or inverse Levich plots of $i_L^{-1}$ vs. $\omega^{1/2}$ (Bard et al.)

The situation at film-covered electrodes obviously is more complex and the rate-limiting steps have been identified and discussed in terms of substrate diffusion or permeation (the so-called S regime, c.f. Andrieux et al.):

$$i_s = \frac{nFA\,C^*\kappa D_F}{d} \qquad (2)$$

diffusive charge propagation through the film (the E regime in the Saveant notation, (c.f. Andrieux et al.)

$$i_e = nFA\Gamma D_e/d^2 \qquad (3)$$

or the rate of the (bimolecular) cross-exchange reaction (the R regime):

$$i_k = nFA\kappa C^* \Gamma k \qquad (4)$$

In Eqns. 2–4, $\kappa$ is the partition coefficient of the substrate in the film, $D_F$ is the corresponding diffusion coefficient ($D_F$ is usually $<<D^s$), $\Gamma$ is the redox mediator (or catalyst) concentration in the film (mol/cm$^2$), $D_e$ is the diffusion coefficient for charge propagation, d is the film thickness and k is the rate constant. These equations represent limiting situations and combinations have been also discussed (S+E, R+S, etc.) (Andrieux et al.; Murray). Experimentally the rate-limiting step may be identified through variation of d and $\Gamma$ although not always independently of each other.

Both substrate permeation and charge propagation limitations manifest as a decrease of the catalytic current with the film thickness—a trend clearly not applicable to the present inventors' system (c.f. FIGS. 3A and 3B). By way of contrast, Jakobs et al. report a decrease of the ORR current with increasing film thickness for polypyrrole in the range from 30 mC/cm$^2$ to 240 mC/cm$^2$. This is just the opposite of what the present inventors observe for both ppy and ppy/Pt films (e.g. FIG. 12B). Further, as pointed out in an introductory paragraph, Holdcroft et al. attribute the non-linearity in their Levich plots to $O_2$ permeation limitations in polypyrrole containing homogeneously dispersed platinum. However, from the preceding discussion, it is clear that such a trend need not imply type S behavior per se, and could well be a manifestation of kinetics limitations see above). The key lies in the variation of the catalytic current with the film thickness. The difference between the present inventors' results and those of Jakobs et al. could well be materials-related as pointed out earlier. The present inventors' explanation for the increase observed in FIG.12B in the ORR with the polypyrrole film thickness lies with the microporosity of the material. Electron microscopy as well as other types of analyses (Penner et al.) have shown that the thicker films have a less compact structure and thus a higher internal surface. This results in an enhancement of the catalytic current.

The intercept of the plots in FIG. 12B (and for the other samples) to d=0 yields the current corresponding to a "two-dimensional" ppy surface; i.e., the influence of the film porosity is now removed. These currents are plotted in FIG. 12C in the inverse Levich (Koutecky-Levich) format for ppy and for the three ppy/Pt samples. A value for n is accessible from the slopes of the plots in FIG. 12C if $D_s$ and $C^*$ are known. A value for $D_s$ for $O_2$ in 0.05M $H_3PO_4$ is not available, to the present inventors' knowledge, in the literature. However, it was assumed that $D_s$ varies with the concentration of $H_3PO_4$ in a manner similar to that observed for $H_2SO_4$ (Bose et al.). This then yields a value of $D_s$ of $2\times 10^{-5}$ cm$^2$s$^{-1}$. From Gubbins et al., $C^*$ was taken as $1.2\times 10^{-6}$ mol/cm$^3$ and $\nu$ was taken as 0.01 cm$^2$s$^{-1}$ (Bard et al.). The variation of n, thus computed from the Koutecky-Levich slopes in FIG. 12C, is plotted in FIG. 12D as a function of the platinum loading of the electrosynthesis medium. A systematic increase in n with the platinum content of the polypyrrole film is observed, although the values depart from the $2e^{--}$ and $4e^{--}$ stoichiometry expected for the ORR for the peroxide and water routes respectively. This departure may be reconciled on the basis of the surface roughness, and the consequent uncertainty associated with the electrode area. Thus, while the data in FIG. 12C pertain to a two-dimensional polypyrrole film, the influence of (exterior) surface topology still must exert an effect on the measured currents. The dashed curve in FIG. 12D has been adjusted to fit the terminal data points to the expected $2e^{--}$ and $4e^{--}$ levels respectively. Such an adjustment translates to a surface roughness of $\approx 1.2$ for the ppy and ppy/Pt samples—well within the range reasonable for these materials. The transition from a $2e^{--}$ to a $4e^{--}$ ORR pathway has also been observed by York et al.—albeit for ppy and ppy/Pt samples, which undoubtedly differ in microstructural details from those of the present inventors, and for $O_2$-saturated 0.5M $H_2SO_4$ solutions.

The intercepts in FIG. 12C pertain to $\omega \to \infty$, and yield the kinetically-controlled currents, $i_k$ (c.f. Eqn. 4). The variation of $i_k$ with the platinum loading of the polypyrrole film is illustrated in FIG. 12E. An increase in the catalyst loading is beneficial in terms of catalytic behavior up to 2 mM beyond which rate saturation is observed. (This trend is also evident in FIG. 12C.) Thus, at high film loadings there clearly is optimal utilization of the catalyst. The data in FIG. 12E yield an upper-limit estimate of the bimolecular rate constant, k, for the ORR via Eqn. 4. Taking n=4, K=1, a value for $\Gamma$ ($1.8 \times 10^{-7}$ mol/cm²) for the ppy/Pt/2 sample, as computed from the platinum assay in a companion Example, and $i_k = \approx 1.1$ mA/cm² (c.f. FIG. 12E), the present inventors estimate k to be $1.3 \times 10^4$ cm³mol$^{-1}$s$^{-1}$ for the ORR.

The HOR Data

As mentioned earlier, the negligible catalytic activity of ppy towards the HOR makes background correction more straightforward than in the ORR case. FIG. 12F contains representative voltammograms for a ppy/Pt/2 sample in $H_2$ saturated 0.5M $H_2SO_4$ as a function of the electrode rotation speed. A "background" cyclic voltammogram (labelled "0") is also shown, and represents the current flow due to doping-undoping of the polymer film in this ($N_2$-saturated) electrolyte. This process obviously is not dependent on the electrode rotation speed, especially at the reasonably high ionic strength employed here for the electrolyte. This was confirmed for the range of rotation speeds employed here. Thus extrapolation of a Levich plots of i vs. $\omega^{\frac{1}{2}}$ (c.f. Eqn. 1) to $\omega=0$ affords a route to the separation of the polymer redox current component from the total measured values ($i_{tot}$). Such plots are shown in FIG. 12G for a representative sample (ppy/Pt/2) with the film thickness as a parameter. The currents in FIG. 12G refer to an applied potential of 1.25 V (c.f. FIG. 12F). Subtraction of the redox currents from $i_{tot}$ then yields the current flow originating exclusively from the HOR. Note that for the plots in FIG. 12G, only the first four rotation speeds are employed because the curvature associated with the inclusion of higher rotation speeds would introduce error in the extrapolation. Similarly, note that the extrapolation procedure is preferred to the use of the current values at $\omega=0$ for the $H_2$-saturated electrolyte because of complications induced by convection (Pleskov et al.). A similar procedure has been employed for "background" correction, albeit for other types of electrodes and electrochemical reactions (Bose et al., Pleskov et al.).

FIG. 12H contains Koutecky-Levich plots constructed from the background-corrected current data in FIG. 12G for the ppy/Pt/2 sample. Again film thickness is shown as the parameter. For reference, the plot (dashed line) for a massive platinum electrode is also shown. The intercepts in FIG. 12H yield the kinetic current, $i_k$ for the HOR (c.f. Eqn. 4). The variation of $i_k$ with the film thickness, d for the ppy/Pt/2 sample as well as for ppy/Pt/3 is shown in FIG. 12I. The disposition of the data for these two samples relative to the platinum electrode reveals the remarkable enhancement in the catalytic effect exerted by ppy/Pt for the HOR, i.e., the $i_k$ values are higher (by approximately a factor five) than the corresponding value for massive platinum for the ppy/Pt samples. As in the earlier Example, the present inventors interpret this in terms of the more efficient dispersion (i.e., higher surface area) of the platinum catalyst particles within the polypyrrole matrix. Thus a higher fraction of the surface of an equivalent amount of platinum is exposed to the substrate in the ppy/Pt case. Another possible explanation is a catalyst-polymer interaction to account for the catalytic enhancement in the manner done for other systems recently (Shimazu et al., Gholamian et al.).

As in the ORR case (c.f. FIG. 12C), the slopes of the Koutecky-Levich plots in FIG. 12H afford a route to the determination of n for the HOR. Taking $D_s$ for $H_2$ as $3.85 \times 10^{-5}$ cm²/s, $\nu$ as 0.107 cm²/s (York et al.) and $C^*$ to be $7.232 \times 10^{-7}$ mol cm$^{-3}$, the n values were computed as a function of the polypyrrole film thickness and the platinum loading of the film. The results are shown in FIG. 12J. Again for reference, the corresponding value for the massive platinum electrode is also included in the figure. Clearly with an increase in the magnitude of the two variables considered, namely d and the platinum loading of the polymer film, n approaches the limiting value of 2 as observed for the massive platinum electrode case.

Lyons et al. have presented preliminary RDE voltametry data for a pre-formed polypyrrole alyer onto which platinum particles were incorporated. Interestingly enough, the Koutecky-Levich plots and intercepts for these samples were found to be essentially independent of layer thickness—a trend in clear contradiction to that observed in the present study (c.f. FIGS. 12H and 12I). However, the range of d values explored by Lyons et al. (0.1–0.5 μm) was much more restricted than in this study such that the two cases are not strictly comparable.

EXAMPLE 3

Preparation, Voltametric Characterization and Use of a Composite Containing Chemically-Synthesized Polypyrrole and a Carrier Polymer A simple method for the voltametric characterization of chemically-synthesized conductive polymers such as polypyrrole is demonstrated. This method consists of dispersing the conductive polymer particles in a carrier polymer solution [e.g., Nafion ® or poly(vinyl-chloride)], and subsequently immobilizing the resulting composite on a support electrode surface. The utility of these materials in electrocatalytic applications is also illustrated using the hydrogen evolution reaction as an example.

Oxidation of heterocycles such as pyrrole, thiophene and aniline to yield electronically conductive polymers is possible via electrochemical or chemical routes. However, chemical methods are more attractive, both when large quantities of the material are required and for certain device applications, including batteries and fuel cells. Voltametric examination of the chemically-synthesized material often is a problem unlike its electrochemical counterpart. One of the strategies that can be employed for electrode preparation is pelletization (c.f. Mermilliod et al.). The present invention describes a simpler alternative which is based on dispersing the material of interest in a "carrier" polymer such as Nafion ® or poly(vinylchloride), for example. The approach of the present inventors shares some features with the carbon paste technique for the voltametric examination of species of interest (c.f. Adekola et al.) as well as with a more recent study involving the chemical synthesis of polyaniline within a Nafion® membrane (Fabrizio et al.).

Composites of polypyrrole (or polyaniline) with other polymers have been previously examined within the context of imparting better mechanical characteristics to the electronically-conductive polymer. However, the vast majority of these materials have been prepared via the electrochemical route.

Aside from characterization and application (e.g., catalytic) possibilities, the present invention's composites afford new opportunities for examining certain fundamental issues related to materials properties (e.g., percolation threshold) by varying the loading of the carrier polymer with the polypyrrole "particles." Unlike other types of dispersed media containing carbon or metal particles, however, the conductivity of polypyrrole (or, equivalently, other conductive polymers) is tunable via modifications in the synthetic procedure.

The oxidizing agent used in the present study was potassium persulfate. Nominally, 250 mL of 0.1 m (1.68 g) of aqueous solution of pyrrole was vigorously mixed at room temperature with 100 mL of 0.15M (10.13 g) solution of $K_2S_2O_8$. After $\approx$30 min. stirring, the solid was filtered under vacuum, thoroughly washed with water and dried at 60° C. under vacuum for $\approx$48 hr. The product analyzed as $(C_4H_3N)_{9.7}SO_4$, implying that one "dopant" anion ($SO_4^{2-}$) on the average was associated with ten oxidized pyrrole rings in the resultant polymer.

The composites were prepared by grinding together (in a mortar and pestle) requisite quantities of this "pyrrole black" and a solution of the carrier polymer to yield a slurry. Either nafion® (5 wt. % solution in alcohols) or poly(vinylchloride)(PVC)(1% carboxylated and dissolved in tetrahydrofuran) was used in this study as the carrier polymer. A small amount of the slurry was spread on a previously-weighed glassy carbon electrode, and the solvent allowed to evaporate from its surface.

FIG. 13A contains cyclic voltammograms in 0.1 m $K_2SO_4$ for a variety of such electrodes containing either Nafion® [Curves (ii), (iii) and (iv)] or PVC [(Curve (v)] as the carrier polymer. An electrochemically prepared polypyrrole film (grown at +850 mV from a solution containing 0.1M pyrrole and 0.1M $K_2SO_4$) is also shown for comparison as Curve (i). Remarkably enough, the cyclic voltammograms for the composite specimens are well-developed with relatively low peak separation ($\Delta E_p$) even at low loadings of polypyrrole [e.g., Curve (ii)]. Further, the chemical architecture of the carrier polymer does not appear to exert an important role in the voltammogram morphology [compare Curves (ii)–(iv) with (v)] illustrating the generality of this approach.

FIG. 13B contains the correlation between the charge encompassed in the anodic wave (c.f. FIG. 1A) versus the amount of polypyrrole in the composite for a large number of specimens including some electrochemically-synthesized samples. These data also illustrate the coulombic advantage with the use of composite specimens relative to the electrochemically-synthesized material; i.e., much higher amounts of charge may be accessed via efficient dispersion of the active material in the composite approach. Correspondingly, scanning electron microscopy reveals the polypyrrole particles in the composite electrodes to possess a finer and distinctly different morphology from the electrochemical counterpart. The saturation in the charge at high ($>\approx$150 μg) polypyrrole loadings may reflect limitations imposed by electrolyte accessibility to the active sites in the polymer.

FIG. 13C and 13D contains polarization curves illustrating the applicability of these composite electrodes in electrocatalytic (e.g., hydrogen evolution reaction, HER) applications. Under favorable conditions, the composite suitably modified with a catalyst such as Pt approaches the efficiency of bulk Pt but at fractional utilization of the noble metal (see Examples 1 and 2). Note the crossover in the two corresponding curves (1 and 2) at positive potentials (between $-0.1$ and $\approx -0.35$ V) which is amplified in the inset. The composite electrode in the absence of Pt also shows a high "background" current flow at potentials positive of $\approx -0.45$ V. These features prior to the standard potential for the her ($-0.33$ V in 0.05M $H_3PO_4$) are attributable to adsorbed hydrogen ("hydride") formation and redox processes in polypyrrole itself. It is also interesting that the presence of polypyrrole shifts the Nafion®-originating current flow to more negative potentials. (Note the similarity of the slopes of the current-potential curves for "3" and "4" at potentials negative of $\approx -0.50$ V.) Finally, the discontinuity in Curve "4" arising from the decrease in the electronic conductivity of polypyrrole has been discussed elsewhere (5).

Further characterization of our composites as well as exploration of new application areas (e.g., sensors, pollution control) for these materials, are in progress in this laboratory.

The following references are incorporated in pertinent part herein for the reasons cited in the above disclosure.

REFERENCES

Adekola et al., Electrochim. acta 37:507 (1992).
Andrieux, J. Electroanal. Chem. 169:9 (1984)(see also references therein).
Anson, in "Proceedings of The Robert A. Welch Foundation Conferences on Chemical Research XXX. Advances in Electrochemistry," Welch Foundation, Houston, TX, 1986, p. 204.
Asavapiriyanont et al., J. Electroanal. Chem. 177: 229 (1984).
Baker et al., J. Electroanal. Chem. 251:307 (1988).
Bard et al., Electrochemical Methods, John Wiley, New York, 19809, Ch. 8, p. 280.
Bartak et al., Anal. Chem. 58:2756 (1986).
Bartak et al., Anal. Chem. 60:2379 (1988).
Beck et al., Electrochim. Acta 37:1265 (1992).
Bedioni et al., J. Electroanal. Chem. 297:257 (1991).
Bookbinder et al., Proc. Natl. Acad. Sci. 77:6280 (1980).
Bose et al., B. Electrochem. 4:437 (1988).
Bruce et al., J. Phys. Chem. 86:1552 (1982).
Bruckenstein et al., Electrochim. Acta 30:1295 (1985).
Chandler et al., J. Appl. Electrochem. 16:62 (1986).
Curran et al., Chem. Soc. Rev. 20:391 (1991).
Daube et al., J. Photochem. 29:71 (1985)(see also references therein).
Deronzier et al., Acc. Chem. Res. 22:249 (1989).
Diaz et al., J. Chem. Soc., Chem. Commun. 397 (1980).
Diaz et al., Chem. Scr. 17:145 (1981).
Dominey et al., J. Am. Chem. Soc. 104:467 (1982).
Eales et al., J. Mater. Sci. 25:3806 (1990).
Fabrizio et al., J. Electroanal. Chem. 300:23 (1991).
Feldman et al., J. Am. Chem. Soc. 107:872 (1985).
Furlong et al., J. Chem. Soc. Farad. Trans. I 80:571 (1984).

Gholamian et al., J. Electroanal. Chem. 289:69 (1990).
Gubbins et al., J. Electrochem. Soc. 112:469 (1965).
Hable et al., Langmuir, in press (courtesy preprint).
Harrison et al., J. Phys. Chem. 88:3932 (1984).
Hillman et al., Langmuir 7:191 (1991).
Hinden et al., U.S. Pat. No. 4,454,169 (1984).
Hirai et al., Macromol. Soc. Chem. A13:727 (1979).
Holdcroft et al., J. Electroanal. Chem. 240:89 (1988).
Itaya et al., J. Electroanal. Chem. 208:373 (1986).
Jakobs et al., Electrochim. Acta 30:1433 (1985).
Kao et al., J. Am. Chem. Soc. 106:473 (1984).
Kawai et al., J. Electrochem. Soc. 137:1739 (1990).
Kuwabata et al., Bull. Chem. Soc. Jpn. 57:2247 (1984).
Kuwana et al., U.S. Pat. No. 4,541,905 (1985).
Leone et al., J. Electrochem. Soc. 139:438 (1992).
Liu et al., J. Electroanal. Chem. 158:181 (1983).
Lyons et al. (a), J. Electroanal. Chem. 261:51 (1989).
Lyons et al. (b), Faraday Discuss. Chem. Soc. 88:39 (1989).
Lyons et al., J. Electroanal. Chem. 304:1 (1991).
Mermilliod et al., Electrochem. Soc. Letters 133:1073 (1986).
Mills et al., J. Chem. Soc., Farad. Trans. I 78:3659 (1982)(see also references therein).
Mukerjee, J. Appl. Electrochem. 20:537 (19990).
Murray in A. J. Bard (Ed.), Electroanalytical Chemistry, Marcel Dekker, New York, 1984, Vol. 13, p. 191.
Noufi, J. Electrochem. Soc. 130:2126 (1983).
Okabayahi et al., J. Chem. Soc. Chem. Commun. 684 (1983).
Penner et al., J. Phys. Chem. 92:5274 (1988).
Pickup et al., J. Electrochem. Soc. 130:2205 (1983).
Pleskov et al., The Rotating Disc Electrode, Consultants Bureau, New York and London, 1976, p. 255.
Rheenen et al., Solid State Commun. 57:865 (1986).
Sauerbrey, Z. Phys. 155:206 (1959).
Schumacher, Angew. Chem. Intl. Ed., 29:329 (1990).
Shimazu et al., J. Electroanal. Chem. 284:523 (1990)(see also references therein).
Simon et al., J. Phys. Chem. 87:4446 (1983).
Simon et al.(b), Inorg. Chem. 24:3119 (1985).
Stalder et al.(a), J. Am. Chem. Soc. 106:2723 (1984).
Stalder et al.(b), J. Am. Chem. Soc. 106:3673 (1984).
Thompson et al., Analyst 116:881 (1991).
Tian et al., J. Electroanal. Chem. 308:357 (1991).
Tourilion et al.(a), J. Electroanal. Chem. 178:357 (1984).
Tourilion et al. (b), J. Phys. Chem. 88:5281 (1984).
Turkevich et al., Disc. Farad. Soc. 11:55 (1951).
Vork et al., Electrochim. Acta 31:1569 (1986).
Vork et al., Electrochim. Acta 32:1187 (1987).
Vork et al., Electrochim. Acta 35:135 (1990).
Weisshaar et al., J. Electroanal. Chem. 163:395 (1984).
Wessling, Synth. Metals 41:1057 (1991).
Yasser et al., J. Electroanal. Chem. 255:53 (1988).
Yoneyama et al., J. Electrochem. Soc. 137:3826 (1990).

What is claimed is:

1. A method of producing an electronically conductive polymer film comprising colloidal catalytic particles homogenously dispersed therein, the method comprising:
   preparing a colloidal suspension of catalytic particles in a solution comprising an electronically conductive polymer precursor; and
   electrosynthesizing an electronically conductive polymer film containing homogeneously dispersed colloidal catalytic particles.

2. The method of claim 1 where the catalytic particles are platinum.

3. The method of claim 1 where the polymer precursor is pyrrole and the electronically conductive polymer is polypyrrole.

4. The method of claim 1 where the catalytic particles are platinum and the preparation step involves citrate reduction of Pt(IV) to $Pt^0$.

5. The method of claim 4 where the citrate is at a level which is sub-stoichiometric to Pt(IV) level.

* * * * *